US012671036B2

(12) United States Patent
Tateishi et al.

(10) Patent No.: US 12,671,036 B2
(45) Date of Patent: Jun. 30, 2026

(54) MULTILAYER CERAMIC CAPACITOR

(71) Applicant: Murata Manufacturing Co., Ltd., Nagaokakyo (JP)

(72) Inventors: Shota Tateishi, Nagaokakyo (JP); Satoshi Fukuda, Nagaokakyo (JP); Daisuke Fukuda, Nagaokakyo (JP); Tomohiro Kageyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 306 days.

(21) Appl. No.: 18/627,903

(22) Filed: Apr. 5, 2024

(65) Prior Publication Data

US 2025/0292971 A1 Sep. 18, 2025

(30) Foreign Application Priority Data

Mar. 12, 2024 (JP) ................................. 2024-038341

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/224* | (2006.01) |
| *H01G 4/248* | (2006.01) |
| *H01G 4/38* | (2006.01) |

(52) U.S. Cl.
CPC .............. *H01G 4/38* (2013.01); *H01G 4/008* (2013.01); *H01G 4/012* (2013.01); *H01G 4/12* (2013.01); *H01G 4/30* (2013.01)

(58) Field of Classification Search
CPC ...... H01G 4/012; H01G 4/1227; H01G 4/248; H01G 4/30; H01G 4/38; H01G 4/008; H01G 4/12
See application file for complete search history.

(56) References Cited

U.S. PATENT DOCUMENTS

| | | | |
|---|---|---|---|
| 2011/0110014 A1* | 5/2011 | Hirata | H01G 4/005 |
| | | | 156/89.12 |
| 2013/0002388 A1* | 1/2013 | Kim | H01G 4/30 |
| | | | 336/200 |
| 2016/0196917 A1* | 7/2016 | Lim | H01G 4/012 |
| | | | 361/301.4 |
| 2018/0102217 A1* | 4/2018 | Fukunaga | H01G 4/232 |
| 2021/0104364 A1* | 4/2021 | Okuda | H01G 4/1218 |
| 2022/0165496 A1* | 5/2022 | Nishikori | H01G 4/30 |
| 2023/0115608 A1* | 4/2023 | Sugita | H01G 4/224 |
| | | | 361/301.4 |
| 2024/0234030 A1* | 7/2024 | Yasuda | H01G 2/12 |

FOREIGN PATENT DOCUMENTS

| | | |
|---|---|---|
| JP | H0817677 A | 1/1996 |
| JP | 2012-209495 A | 10/2012 |
| JP | 2013093374 A | 5/2013 |
| KR | 20220085717 A | 6/2022 |

* cited by examiner

*Primary Examiner* — Michael P McFadden
(74) *Attorney, Agent, or Firm* — Keating & Bennett, LLP

(57) ABSTRACT

In a multilayer ceramic capacitor, a plurality of internal electrode layers include a first internal electrode layer, a second internal electrode layer, and an intermediate electrode layer. A coverage of the intermediate electrode layer is higher than a coverage of the first internal electrode layer and the second internal electrode layer.

20 Claims, 8 Drawing Sheets

MULTILAYER CERAMIC CAPACITOR

CROSS REFERENCE TO RELATED APPLICATIONS

This application is based on and claims the benefit of priority from Japanese Patent Application No. 2024-038341, filed on Mar. 12, 2024, the entire contents of which are incorporated herein by reference.

BACKGROUND OF THE INVENTION

1. Field of the Invention

The present invention relates to multilayer ceramic capacitors.

2. Description of the Related Art

Conventionally, multilayer ceramic capacitors designed to withstand high voltage, known as series-structured multilayer ceramic capacitors, have been recognized, in which a plurality of capacitor portions are serially connected (refer to Japanese Unexamined Patent Application, Publication No. 2012-209495).

Series-structured multilayer ceramic capacitors which generate the series-connected capacitance tend to improve voltage resistance at the cost of reduced capacitance. In order to address this, measures such as increasing the number of stacked internal electrode layers and dielectric layers have been adopted to maintain capacitance.

SUMMARY OF THE INVENTION

However, increasing the number of stacked internal electrode layers and dielectric layers leads to increased intrinsic stress caused by the difference in shrinkage between the dielectric layers and the internal electrode layers, which may result in delamination at the interface between the internal electrode layers and the dielectric layers.

Example embodiments of the present invention provide multilayer ceramic capacitors, including high-withstand-voltage multilayer ceramic capacitors, each capable of reducing or preventing interface delamination while decreasing or minimizing a reduction in capacitance.

A multilayer ceramic capacitor according to an example embodiment of the present invention includes a multilayer body that includes a plurality of stacked dielectric layers, a plurality of stacked internal electrode layers, a first main surface and a second main surface on opposite sides in a lamination direction, a first lateral surface and a second lateral surface on opposite sides in a width direction orthogonal or substantially orthogonal to the lamination direction, and a first end surface and a second end surface on opposite sides in a length direction orthogonal or substantially orthogonal to both the lamination direction and the width direction, a first external electrode on the first end surface, and a second external electrode on the second end surface, in which the plurality of internal electrode layers include a first internal electrode layer, a second internal electrode layer, and an intermediate electrode layer, the first internal electrode layer includes a first extension portion with one end extending to the first end surface and connected to the first external electrode, and a first counter portion which is connected to the first extension portion and faces an internal electrode layer adjacent in the lamination direction, the second internal electrode layer includes a second extension portion with one end extending to the second end surface and connected to the second external electrode, and a second counter portion which is connected to the second extension portion and faces an internal electrode layer adjacent in the lamination direction, the intermediate electrode layer, not connected to either the first external electrode or the second external electrode, is an internal electrode layer that defines a serially connected capacitor element together with the first internal electrode layer and the second internal electrode layer, and coverage of the intermediate electrode layer is higher than coverage of the first internal electrode layer and coverage of the second internal electrode layer.

Example embodiments of the present invention provide multilayer ceramic capacitors, including high-withstand-voltage multilayer ceramic capacitors, each capable of reducing or preventing interface delamination while reducing or minimizing a decrease in capacitance.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Hereinafter, multilayer ceramic capacitors according to example embodiments of the present invention will be described. However, the present invention is not limited to the example embodiments described herein.

First Example Embodiment

Figure 1:
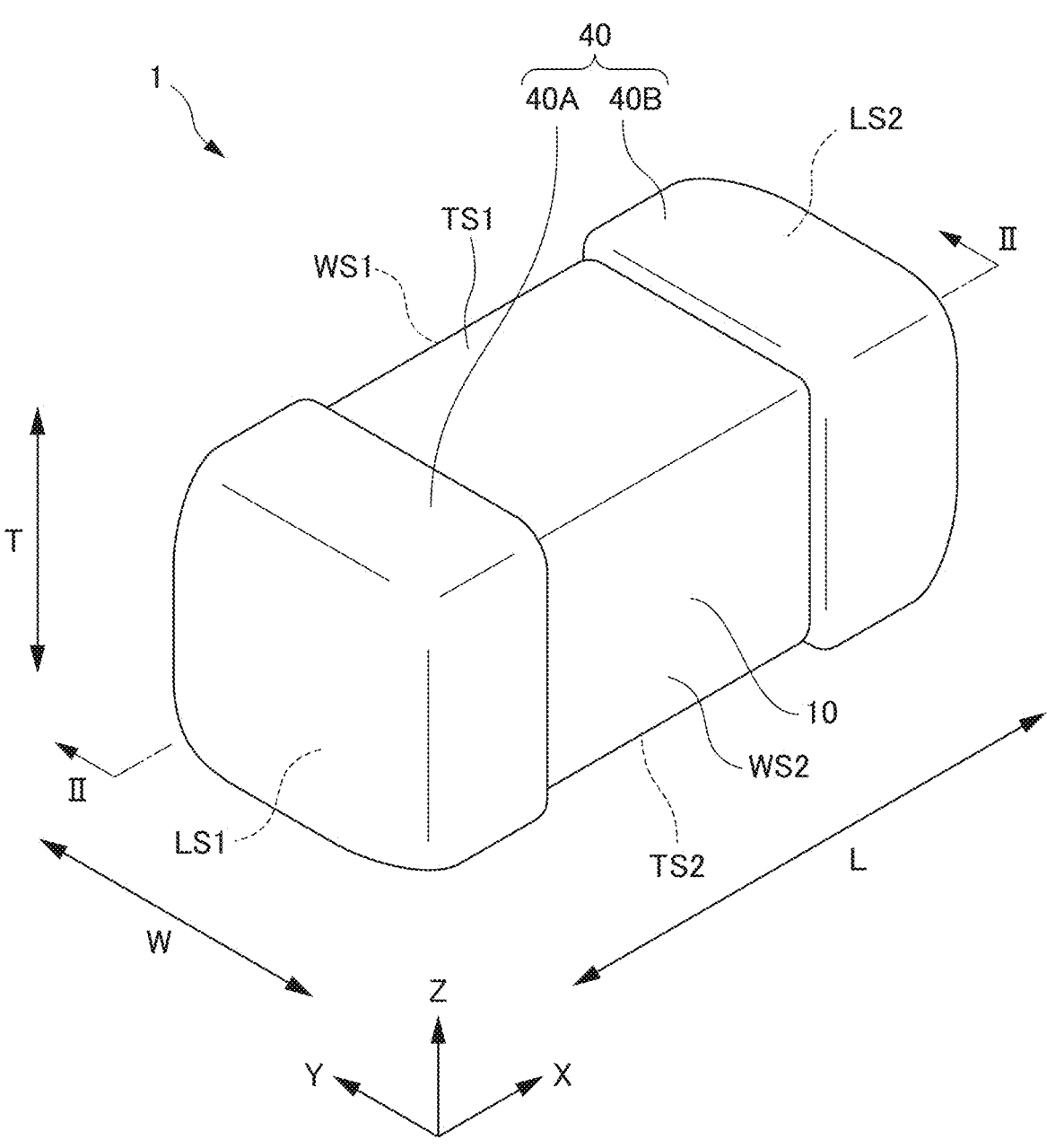
FIG. 1 is an external perspective view of a two-portion-structured multilayer ceramic capacitor according to a first example embodiment of the present invention.
Figure 2:
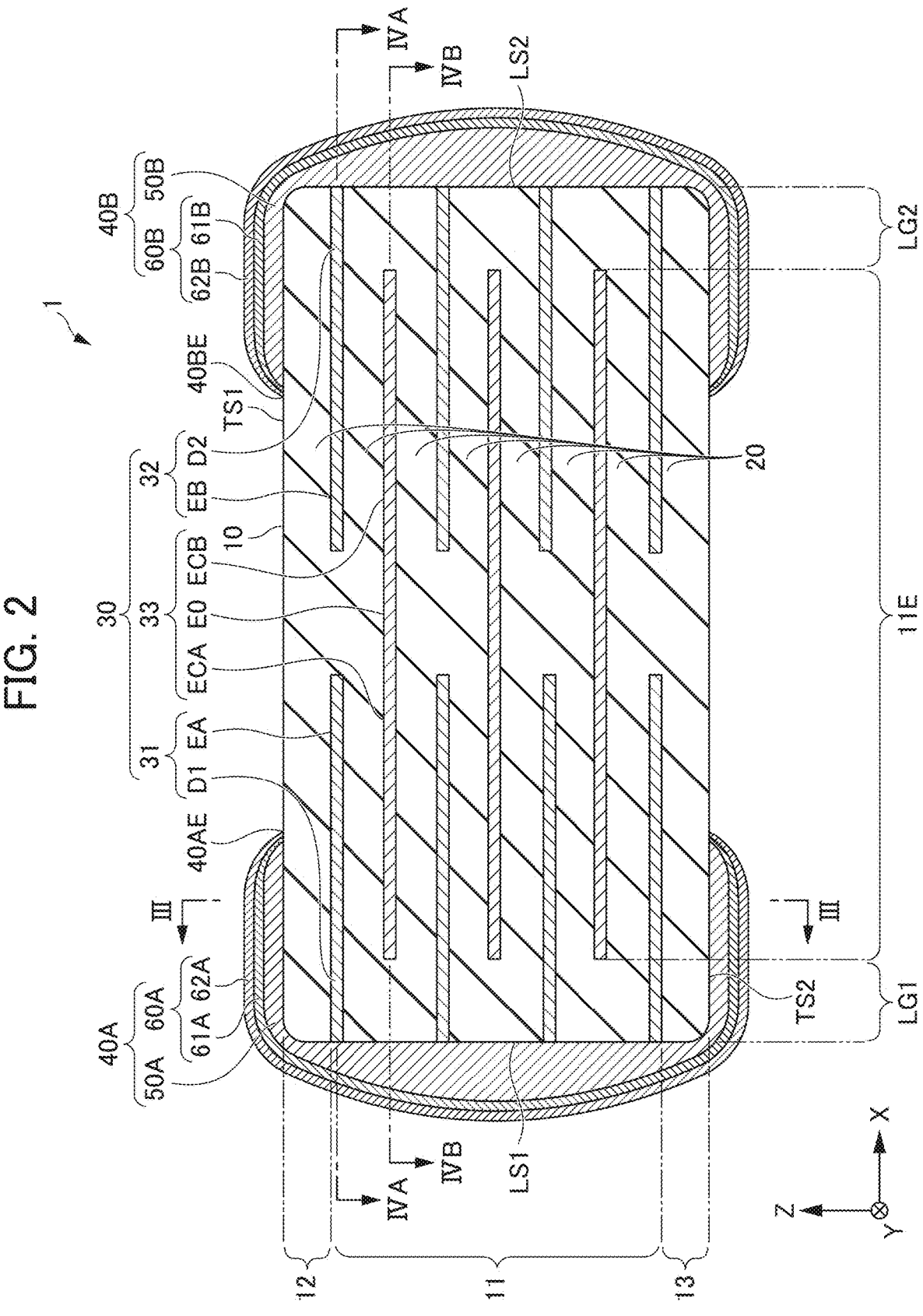
FIG. 2 is a cross-sectional view along the line II-II in FIG. 1, illustrating a schematic structure of the two-portion-structured multilayer body of the first example embodiment of the present invention.
Figure 3:
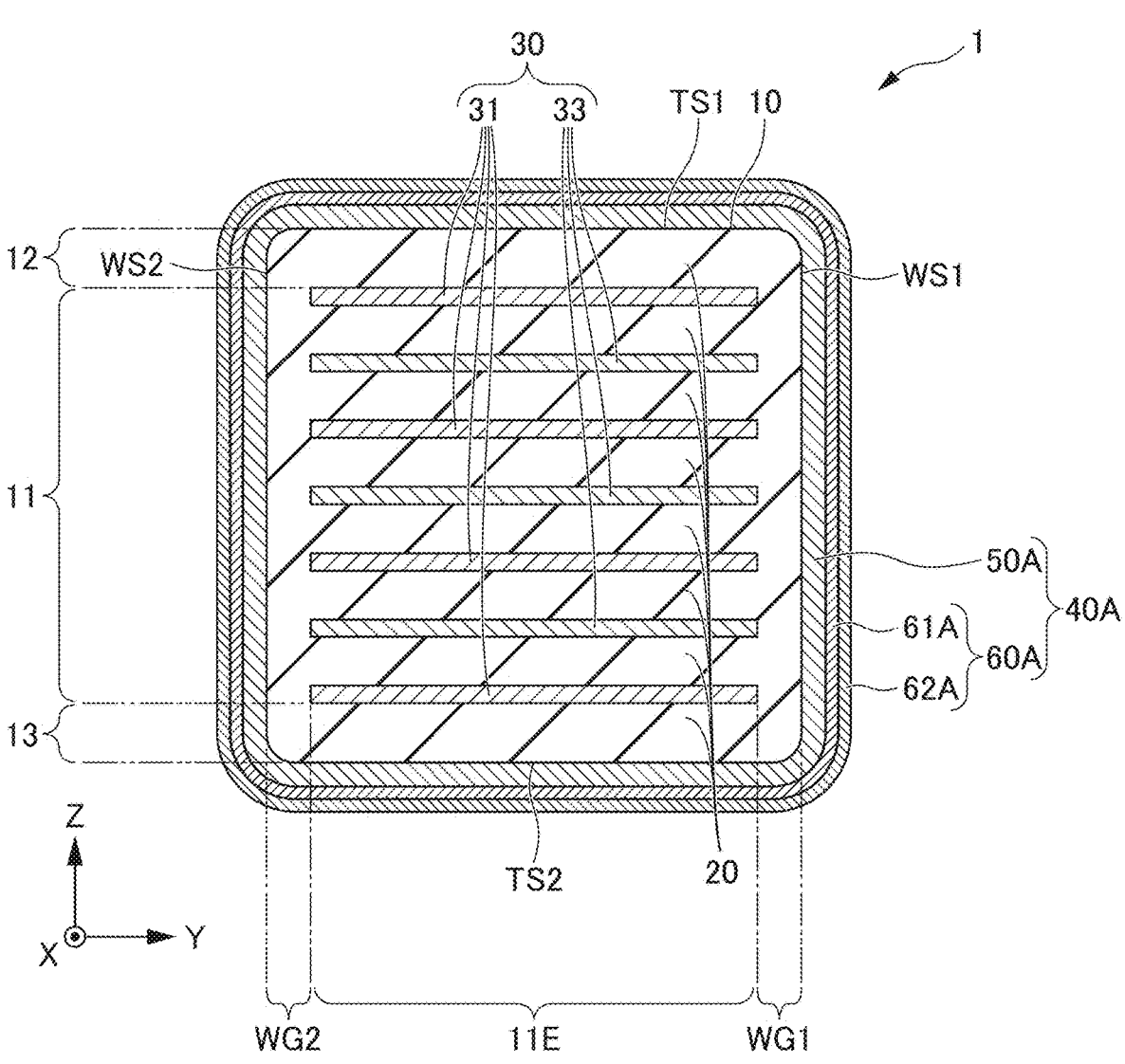
FIG. 3 is a cross-sectional view along the line III-III in FIG. 2.
Figure 4A:
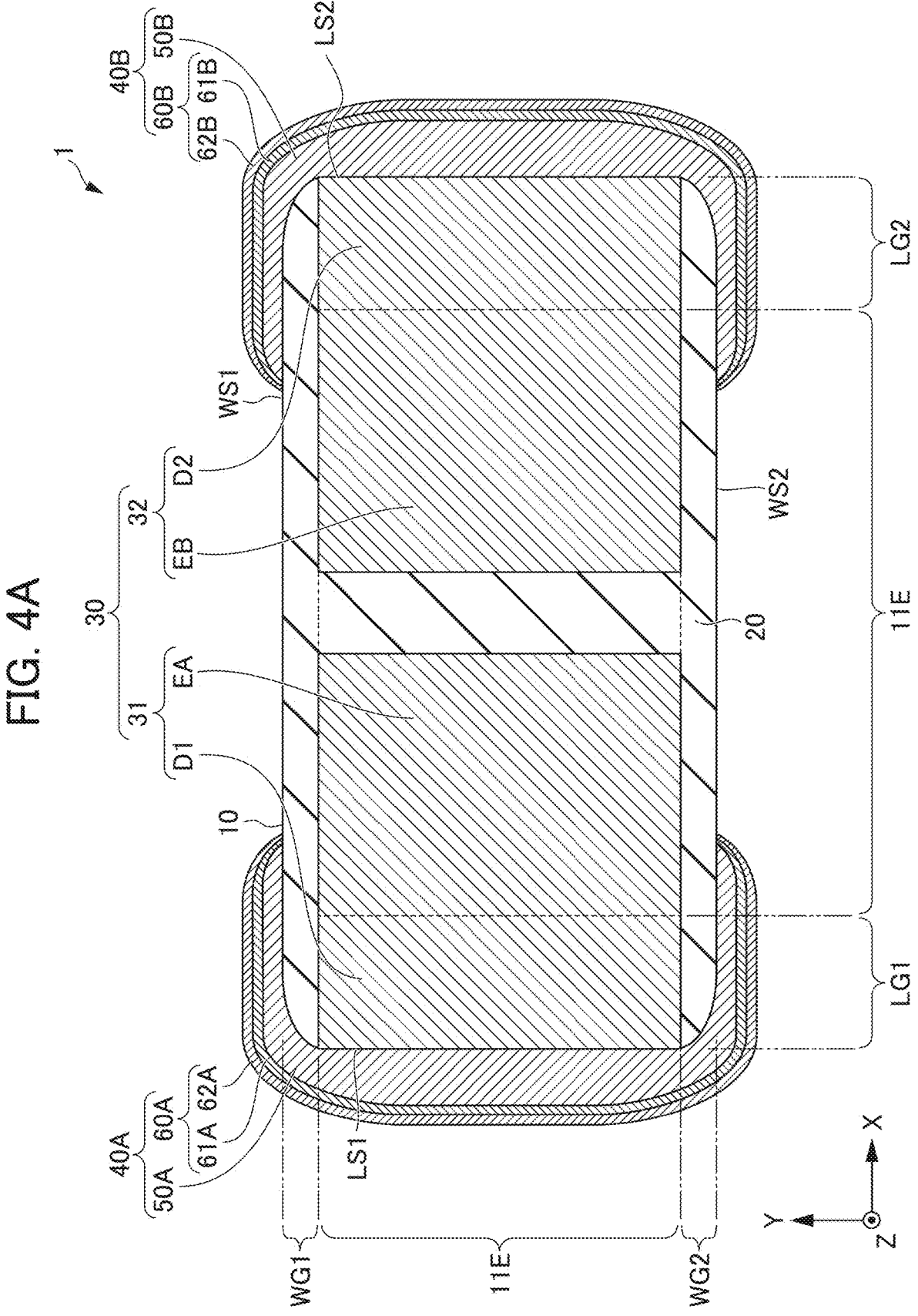
FIG. 4A is a cross-sectional view along the line IVA-IVA in FIG. 2, illustrating the cross section along a first internal electrode layer and a second internal electrode layer.
Figure 4B:
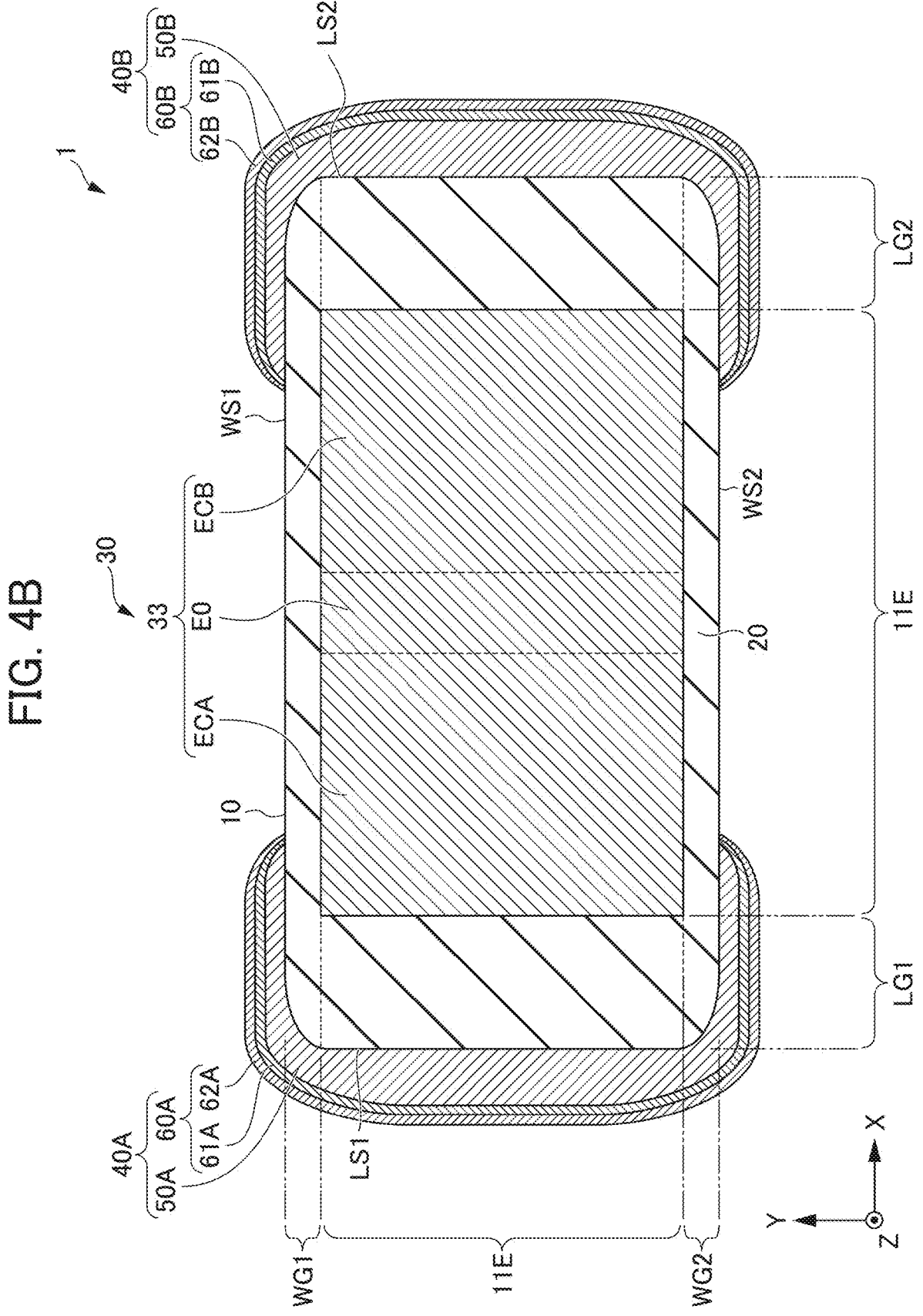
FIG. 4B is a cross-sectional view along the line IVB-IVB in FIG. 2, illustrating the cross section along the intermediate electrode layer.

A multilayer ceramic capacitor 1 as a two-portion-structured multilayer ceramic electronic component according to the first example embodiment of the present disclosure will be described with reference to the drawings. The multilayer ceramic capacitor 1 of the present example embodiment is a temperature-compensating capacitor with a small rate of capacitance change due to temperature variations, and may be included in filters and high-frequency circuit matching. However, the multilayer ceramic capacitor 1 according to the current example embodiment of the present disclosure is not limited to such applications. FIG. 1 is an external perspective view of the two-portion-structured multilayer ceramic capacitor 1 according to the first example embodiment. FIG. 2 is a cross-sectional view along the line II-II in FIG. 1, illustrating the schematic structure of the two-portion-structured multilayer body of the first example embodiment. FIG. 3 is a cross-sectional view along the line III-III in FIG. 2. FIG. 4A is a cross-sectional view along the line IVA-IVA in FIG. 2, illustrating the cross section along the first internal electrode layer and the second internal electrode layer. FIG. 4B is a cross-sectional view along the line IVB-IVB in FIG. 2, illustrating the cross section along the intermediate electrode layer.

The drawings are schematically simplified for the purpose of illustrating example embodiments of the present invention, and the proportions of the illustrated components or the ratios of dimensions between components may not match those described in the specification. Also, components described in the specification may be omitted in the drawings, or their numbers may be omitted for simplicity. For example, the number of the internal electrode layers illustrated in FIGS. 2 and 3 is seven for the sake of explanation, but this does not indicate the actual number of the internal electrode layers 30. The same applies to FIGS. 5 to 7. Terms used to describe example embodiments of the present invention to specify shapes, geometrical conditions, and the extent thereof, such as "parallel", "orthogonal", "identical", and values of lengths and angles, are intended to be interpreted inclusively within a range that could achieve similar functionality, not limited to their strict meanings.

As illustrated in FIG. 1, the shape of the multilayer ceramic capacitor 1 according to a example embodiment is substantially rectangular parallelepiped. The multilayer ceramic capacitor 1 includes a rectangular or substantially rectangular parallelepiped multilayer body 10 and a pair of external electrodes 40 spaced apart from each other at both ends of the multilayer body 10.

In FIG. 1, the arrow T indicates the lamination direction of the multilayer ceramic capacitor 1 and the multilayer body 10. The lamination direction T also represents the thickness direction and the height direction of the multilayer ceramic capacitor 1 and the multilayer body 10. In FIG. 1, the arrow L indicates the length direction of the multilayer ceramic capacitor 1 and the multilayer body 10, in which the length direction is orthogonal or substantially orthogonal to the lamination direction T. In FIG. 1, the arrow W indicates the width direction of the multilayer ceramic capacitor 1 and the multilayer body 10, in which the width direction is orthogonal or substantially orthogonal to both the lamination direction T and the length direction L. The pair of external electrodes 40 are provided at both ends of the multilayer body 10 in the length direction L.

FIGS. 1 to 4B illustrate an XYZ orthogonal coordinate system. The length direction L of the multilayer ceramic capacitor 1 and the multilayer body 10 corresponds to the X direction. The width direction W of the multilayer ceramic capacitor 1 and the multilayer body 10 corresponds to the Y direction. The lamination direction T of the multilayer ceramic capacitor 1 and the multilayer body 10 corresponds to the Z direction. The cross section illustrated in FIG. 2 is also referred to as an LT cross section. The cross section illustrated in FIG. 3 is also referred to as a WT cross section. The cross section illustrated in FIGS. 4A and 4B is also referred to as an LW cross section.

As illustrated in FIGS. 1 to 4B, the multilayer body 10 includes a first main surface TS1 and a second main surface TS2 on opposite sides in the lamination direction T, a first end surface LS1 and a second end surface LS2 on opposite sides in the length direction L orthogonal or substantially orthogonal to the lamination direction T, and a first lateral surface WS1 and a second lateral surface WS2 on opposite sides in the width direction W orthogonal or substantially orthogonal to both the lamination direction T and the length direction L.

As illustrated in FIG. 1, the shape of the multilayer body 10 is rectangular or substantially rectangular parallelepiped. The dimension in the length direction L of the multilayer body 10 is not necessarily longer than the dimension in the width direction W. The corners and edges of the multilayer body 10 are preferably rounded. The corners are where three surfaces of the multilayer body intersect, and the edges are where two surfaces of the multilayer body intersect. The surfaces of the multilayer body 10 may include irregularities in whole or in part.

The dimensions of the multilayer body 10 are not particularly limited. However, the dimension of the multilayer body 10 in the length direction L, denoted as the L dimension, is preferably between about 0.2 mm and about 10 mm inclusive, for example. The dimension of the multilayer body 10 in the lamination direction T, denoted as the T dimension, is preferably between about 0.1 mm and about 10 mm inclusive, for example. The dimension of the multilayer body 10 in the width direction W, denoted as the W dimension, is preferably between about 0.1 mm and about 10 mm inclusive, for example.

As illustrated in FIGS. 2 and 3, the multilayer body 10 includes an inner layer portion 11, and first and second main surface-side outer layer portions 12 and 13 interposing the inner layer portion 11 in the lamination direction T.

The inner layer portion 11 includes a plurality of dielectric layers 20 and a plurality of internal electrode layers 30, both of which are stacked alternately in the lamination direction T. The inner layer portion 11 includes the internal electrode layers 30, including an internal electrode layer 30 closest to the first main surface TS1 to an internal electrode layer 30 closest to the second main surface TS2, in the lamination direction T. In the inner layer portion 11, the plurality of internal electrode layers 30 face each other interposing the dielectric layers 20. The inner layer portion 11 functions to generate capacitance, and essentially operates as a capacitor.

The plurality of dielectric layers 20 include dielectric materials. The multilayer ceramic capacitor 1 of the present example embodiment, being a temperature-compensating capacitor as mentioned above, dielectric materials such as those from the $CaZrO_3$ type (which may hereinafter be abbreviated as CZ type) and $Ca(Sr, Zr)O_3$ type (which may hereinafter be abbreviated as CSZ type). Dielectric materials from the CZ and CSZ type include perovskite-type compounds including at least Ca and Zr. The dielectric materials of the CZ type encompass not only $CaZrO_3$ but also materials where a portion of Ca, a portion of Zr, or portions of both Ca and Zr are substituted with suitable elements, including $CaZrO_3$ solid solutions. The dielectric materials include at least one of Ca (Calcium), Zr (Zirconium), and Ti (Titanium). For example, the dielectric layer 20 may include perovskite-type compounds that include Ca and Zr, and optionally Sr and Ti. Specifically, the dielectric layer 20 includes calcium zirconate ($CaZrO_3$), calcium titanate ($CaTiO_3$), strontium titanate ($SrTiO_3$), barium zirconate ($BaZrO_3$, a proton-conductive metal oxide), or titanium oxide ($TiO_2$), among others. Typically, the multilayer ceramic capacitor 1 is fired in a reducing atmosphere, leading to the formation of oxygen vacancies. However, especially, $CaZrO_3$ can reduce or prevent the generation of oxygen vacancies due to its high band gap. As a result, high reliability can be achieved. The dielectric material may also include secondary components such as Mn, Fe, Cr, Co, or Ni compounds added to these main components.

The dielectric layers 20 of the present example embodiment use materials including at least one of Ca (Calcium), Zr (Zirconium), and Ti (Titanium), thus have a relative permittivity of about 20 to 300, which results in smaller capacitance compared to high permittivity systems. The dielectric layers 20 of the present example embodiment are characterized in the relative permittivity changing almost linearly with temperature, resulting in excellent heat resistance and high-frequency characteristics. The dielectric layers 20 in the present example embodiment negligibly change in capacitance value over time, and exhibit low capacitor loss and excellent stability even under high temperature, high power, and high frequency conditions. The dielectric layers 20 exhibit minimal changes in permittivity over time and under applied voltage. The dielectric material is not limited to these examples. For instance, high permittivity ceramics such as $BaTiO_3$ type (BT type) may also be used.

The thickness of the dielectric layers 20 is preferably between about 0.2 µm and about 10 µm inclusive, for example. In particular, the thickness of the dielectric layers 20 is preferably about 3 µm and about 10 µm inclusive, for example. The number of dielectric layers 20 to be stacked (laminated) is preferably between 15 and 1200 inclusive, for example. The number of dielectric layers 20 is the total of the number of dielectric layers 20 in the inner layer portion 11, and the number of the dielectric layers 20 in the first main surface-side outer layer portion 12 and the second main surface-side outer layer portion 13.

The plurality of internal electrode layers 30 include a plurality of first internal electrode layers 31, a plurality of second internal electrode layers 32, and an intermediate electrode layer 33. The first internal electrode layers 31 and the second internal electrode layers 32 are adjacently spaced apart in the length direction L. The first and second internal electrode layers 31 and 32 and the intermediate electrode layer 33 are alternately provided in the lamination direction T interposing the dielectric layers 20 therebetween.

The first internal electrode layers 31 extend to the first end surface LS1, and are connected to a first external electrode 40A (to be described later). The second internal electrode layers 32 extend to the second end surface LS2, and are connected to a second external electrode 40B (to be described later). The intermediate electrode layer 33 does not extend to either the first end surface LS1 or the second end surface LS2, and is not connected to either the first external electrode 40A or the second external electrode 40B. The serially connected capacitor elements are defined by the first internal electrode layers 31, the intermediate electrode layer 33, and the second internal electrode layers 32, which are included in the plurality of internal electrode layers 30. Hereinafter, unless necessary to distinguish, the first internal electrode layers 31, the second internal electrode layers 32, and the intermediate electrode layer 33 may collectively be referred to as the internal electrode layers 30.

As illustrated in FIGS. 2 and 4A, the first internal electrode layer 31 includes a first counter portion EA and a first extension portion D1. The first counter portion EA faces the intermediate electrode layer 33 adjacent in the lamination direction T, interposing the dielectric layer 20 therebetween, provided inside the multilayer body 10. The first internal electrode layer 31 includes a first counter portion EA connected to the first extension portion D1, and facing another internal electrode layer 30 adjacent in the lamination direction T. The first extension portion D1 extends from the first counter portion EA to the first end surface LS1, and is exposed at the first end surface LS1. The first internal electrode layer 31 includes the first extension portion D1, one end of which extends to the first end surface LS1 and is connected to the first external electrode 40A.

As illustrated in FIGS. 2 and 4A, the second internal electrode layer 32 includes a second counter portion EB and a second extension portion D2. The second counter portion EB faces the intermediate electrode layer 33 adjacent in the lamination direction T, interposing the dielectric layer 20 therebetween, provided inside the multilayer body 10. The second internal electrode layer 32 includes the second counter portion EB connected to the second extension portion D2, and facing another internal electrode layer 30 adjacent in the lamination direction T. The second extension portion D2 extends from the second counter portion EB to the second end surface LS2, and is exposed at the second end surface LS2. The second internal electrode layer 32 includes the second extension portion D2, one end of which extends to the second end surface LS2 and is connected to the second external electrode 40B.

As illustrated in FIGS. 2 and 4B, the intermediate electrode layer 33 includes a first electrode layer-side counter portion ECA, a second electrode layer-side counter portion ECB, and a coupling portion E0. The first electrode layer-side counter portion ECA faces the first internal electrode layer 31 adjacent in the lamination direction T, interposing a dielectric layer 20 therebetween, provided inside the multilayer body 10. The second electrode layer-side counter portion ECB faces the second internal electrode layer 32 adjacent in the lamination direction T, interposing the dielectric layer 20 therebetween, provided inside the multilayer body 10. The coupling portion E0 couples the first electrode layer-side counter portion ECA with the second electrode layer-side counter portion ECB, and is provided between the first electrode layer-side counter portion ECA and the second electrode layer-side counter portion ECB.

In the multilayer ceramic capacitor 1 according to the present example embodiment, the end portion on the first end surface LS1 side of the intermediate electrode layer 33 is spaced apart from the first end surface LS1. In the multilayer ceramic capacitor 1 according to the present example embodiment, the end portion on the first end surface LS1 side of the intermediate electrode layer 33 is provided on the first end surface LS1 side farther than the end portion 40AE of the first external electrode 40A. However, this arrangement is not limiting. The end portion on the first end surface LS1 side of the intermediate electrode layer 33 may also be provided on the second end surface LS2 side farther than the end portion 40AE of the first external electrode 40A.

The end portion on the second end surface LS2 side of the intermediate electrode layer 33 is spaced apart from the second end surface LS2. In the multilayer ceramic capacitor 1 according to the present example embodiment, the end portion on the second end surface LS2 side of the intermediate electrode layer 33 is provided on the second end surface LS2 side farther than the end portion 40BE of the second external electrode 40B. However, this arrangement is not limiting. The end portion on the second end surface LS2 side of the intermediate electrode layer 33 may also be provided on the first end surface LS1 side farther than the end portion 40BE of the second external electrode 40B.

As illustrated in FIG. 2, in the multilayer ceramic capacitor 1 according to the first example embodiment, the first internal electrode layer 31 and the second internal electrode layer 32 are provided adjacent in the length direction L. In the multilayer ceramic capacitor 1 according to the first example embodiment, the first internal electrode layers 31 and the second internal electrode layers 32 are stacked alternately to overlap the intermediate electrode layer 33, interposing the dielectric layers 20.

In the present example embodiment, the first counter portion EA and the first electrode layer-side counter portion ECA face each other, interposing the dielectric layer 20, thus generating the capacitance CAP1 (first capacitor portion CAP1). The second counter portion EB and the second electrode layer-side counter portion ECB of the intermediate electrode layer 33, which includes the first electrode layer-side counter portion ECA, facing each other, interposing the dielectric layer 20, thus generating the capacitance CAP2 (second capacitor portion CAP2). The coupling portion E0 serially connects the capacitance CAP1 and the capacitance CAP2. The multilayer ceramic capacitor 1 of the present example embodiment is a so-called two-portion series-structured multilayer ceramic capacitor 1, in which two capacitor portions are serially connected.

The shapes of the first counter portion EA, the second counter portion EB, the first electrode layer-side counter portion ECA, and the second electrode layer-side counter portion ECB are not particularly limited but are preferably rectangular or substantially rectangular. However, the corners of the rectangular or substantially rectangular shape may be rounded or formed diagonally. The shapes of the first extension portion D1 and the second extension portion D2 are not particularly limited but are preferably rectangular or substantially rectangular. Again, the corners of the rectangular shape may be rounded or formed diagonally. The shape of the coupling portion E0 is not particularly limited but is preferably rectangular or substantially rectangular.

The dimensions of the first counter portion EA and the first extension portion D1 in the width direction W may be the same, or one of the dimensions may be smaller. The dimensions of the second counter portion EB and the second extension portion D2 in the width direction W may be the same, or one of the dimensions may be smaller. The dimensions of the first and second electrode layer-side counter portions ECA and ECB and the coupling portion E0 in the width direction W may be the same, or one of the dimensions may be smaller.

The first internal electrode layer 31, the second internal electrode layer 32, and the intermediate electrode layer 33 may include suitable conductive materials such as metals including Ni, Cu, Ag, Pd, Au, or alloys including at least one of these metals. When alloys are used, the first internal electrode layer 31, the second internal electrode layer 32, and the intermediate electrode layer 33 may include, for example, an Ag—Pd alloy.

The thickness of the first internal electrode layer 31, the second internal electrode layer 32, and the intermediate electrode layer 33 is preferably between about 0.2 μm and about 2.0 μm inclusive, for example. The total number of the first internal electrode layer 31, the second internal electrode layer 32, and the intermediate electrode layer 33 combined is preferably between 15 and 1000 inclusive.

As illustrated in FIGS. 2 and 3, the first main surface-side outer layer portion 12 is provided on the first main surface TS1 side of the multilayer body 10. The first main surface-side outer layer portion 12 is a collective portion including the plurality of dielectric layers 20 between the first main surface TS1 and the internal electrode layer 30 closest to the first main surface TS1. On the other hand, the second main surface-side outer layer portion 13 is provided to the second main surface TS2 side of the multilayer body 10. The second main surface-side outer layer portion 13 is a collective portion including the plurality of dielectric layers 20 between the second main surface TS2 and the internal electrode layer 30 closest to the second main surface TS2. The dielectric layers 20 used for the first main surface-side outer layer portion 12 and the second main surface-side outer layer portion 13 may be the same as the dielectric layers 20 used for the inner layer portion 11.

The multilayer body 10 includes a series capacitor defining portion 11E. The series capacitor defining portion 11E includes a portion where the first counter portion EA of the first internal electrode layer 31 faces the first electrode layer-side counter portion ECA of the intermediate electrode layer 33 (portion generating the capacitance CAP1), a portion where the second counter portion EB of the second internal electrode layer 32 faces the second electrode layer-side counter portion ECB of the intermediate electrode layer 33 (portion generating the capacitance CAP2), and a portion serially connecting the capacitance CAP1 with the capacitance CAP2. The series capacitor defining portion 11E is a portion of the inner layer portion 11. FIGS. 4A and 4B illustrate the range of the series capacitor defining portion 11E in the width direction W and the length direction L. The portions of the series capacitor defining portion 11E, which generate the capacitance CAP1 (first capacitor portion CAP1) and capacitance CAP2 (second capacitor portion CAP2), are also referred to as the capacitor active portions.

The multilayer body 10 includes lateral surface-side outer layer portions. The lateral surface-side outer layer portions include a first lateral surface-side outer layer portion WG1 and a second lateral surface-side outer layer portion WG2. The first lateral surface-side outer layer portion WG1 is a portion including the dielectric layers 20 between the series capacitor defining portion 11E and the first lateral surface WS1. The second lateral surface-side outer layer portion WG2 is a portion including the dielectric layers 20 between the series capacitor defining portion 11E and the second lateral surface WS2. FIGS. 3, 4A, and 4B illustrate the range of the first lateral surface-side outer layer portion WG1 and the second lateral surface-side outer layer portion WG2 in the width direction W. These lateral surface-side outer layer portions are also referred to as W gaps or side gaps.

The multilayer body 10 includes end surface-side outer layer portions. The end surface-side outer layer portions include a first end surface-side outer layer portion LG1 and a second end surface-side outer layer portion LG2. The first end surface-side outer layer portion LG1 is a portion including the dielectric layers 20 and the first extension portion D1, provided between the series capacitor defining portion 11E and the first end surface LS1. In other words, the first end surface-side outer layer portion LG1 is a collective portion including a portion of the plurality of dielectric layers 20 on the first end surface LS1 side and the plurality of first extension portions D1. The second end surface-side outer layer portion LG2 is a portion including the dielectric layers 20 and the second extension portion D2, provided between the series capacitor defining portion 11E and the second end surface LS2. In other words, the second end surface-side outer layer portion LG2 is a collective portion including a portion of the plurality of dielectric layers 20 on the second end surface LS2 side and the plurality of second extension portions D2. FIGS. 2, 4A, and 4B illustrate the range of the first end surface-side outer layer portion LG1 and the second end surface-side outer layer portion LG2 in the length direction L. The end surface-side outer layer portions are also referred to as L-gaps or end gaps.

The series capacitor defining portion 11E of the multilayer body 10 includes a series connection region. The series connection region is a portion including the dielectric layer 20 and the coupling portion E0, which are provided between the portion generating the capacitance CAP1 and the portion generating the capacitance CAP2. In other words, the series connection region is a collective portion including the central portion of the plurality of dielectric layers 20 in the length direction L, and the plurality of coupling portions E0. The series connection region is also referred to as a middle gap.

As illustrated in FIGS. 1 and 2, the external electrodes 40 include the first external electrode 40A on the first end surface LS1 side of the multilayer body 10, and the second external electrode 40B on the second end surface LS2 side of the multilayer body 10.

The basic configurations of the first external electrode 40A and the second external electrode 40B are the same. The shape of the first external electrode 40A and the second external electrode 40B generally is plane-symmetrical with respect to the WT cross section at the center of the multilayer ceramic capacitor 1 in the length direction L. Therefore, unless necessary to distinguish, the first external electrode 40A and the second external electrode 40B may collectively be referred to as the external electrodes 40.

The first external electrode 40A is provided on the first end surface LS1. The first external electrode 40A is in contact with the first extension portions D1 of the plurality of first internal electrode layers 31 exposed at the first end surface LS1. Consequently, the first external electrode 40A is electrically connected to the plurality of first internal electrode layers 31. The first external electrode 40A may also be provided on a portion of the first main surface TS1, a portion of the second main surface TS2, a portion of the first lateral surface WS1, and a portion of the second lateral surface WS2. In the present example embodiment, the first external electrode 40A extends from the first end surface LS1 to a portion of the first main surface TS1, a portion of the second main surface TS2, a portion of the first lateral surface WS1, and a portion of the second lateral surface WS2.

The second external electrode 40B is provided on the second end surface LS2. The second external electrode 40B is in contact with each of the second extension portions D2 of the plurality of second internal electrode layers 32 exposed at the second end surface LS2. Consequently, the second external electrode 40B is electrically connected to the plurality of second internal electrode layers 32. The second external electrode 40B may be provided on a portion of the first main surface TS1, a portion of the second main surface TS2, a portion of the first lateral surface WS1, and a portion of the second lateral surface WS2. In the present example embodiment, the second external electrode 40B extends from the second end surface LS2 to a portion of the first main surface TS1, a portion of the second main surface TS2, a portion of the first lateral surface WS1, and a portion of the second lateral surface WS2.

As previously mentioned, within the multilayer body 10, the first counter portion EA of the first internal electrode layer 31 faces the first electrode layer-side counter portion ECA of the intermediate electrode layer 33, interposing the dielectric layer 20, thus generating the capacitance CAP1 (first capacitor portion CAP1). The second counter portion EB of the second internal electrode layer 32 faces the second electrode layer-side counter portion ECB of the intermediate electrode layer 33, interposing the dielectric layer 20, thus generating the capacitance CAP2 (the second capacitor portion CAP2).

The coupling portion E0 serially connects the capacitance CAP1 and the capacitance CAP2. Therefore, capacitor characteristics capacitance manifest between the first external electrode 40A connected to the first internal electrode layer 31 and the second external electrode 40B connected to the second internal electrode layer 32.

As illustrated in FIG. 2, the first external electrode 40A includes a first base electrode layer 50A, and a first plated layer 60A on the first base electrode layer 50A. Similarly, the second external electrode 40B includes a second base electrode layer 50B, and a second plated layer 60B on the second base electrode layer 50B.

The first base electrode layer 50A is provided on the first end surface LS1. The first base electrode layer 50A is connected to the first extension portions D1 of the plurality of first internal electrode layers 31 exposed at the first end surface LS1. In the present example embodiment, the first base electrode layer 50A extends from the first end surface LS1 to a portion of the first main surface TS1, a portion of the second main surface TS2, a portion of the first lateral surface WS1, and a portion of the second lateral surface WS2.

The second base electrode layer 50B is provided on the second end surface LS2. The second base electrode layer 50B is in contact with the second extension portions D2 of the plurality of second internal electrode layers 32 exposed at the second end surface LS2. In the current example embodiment, the second base electrode layer 50B extends from the second end surface LS2 to a portion of the first main surface TS1, a portion of the second main surface TS2, a portion of the first lateral surface WS1, and a portion of the second lateral surface WS2.

The first base electrode layer 50A and the second first base electrode layer 50B include at least one of a fired layer, a thin film layer, etc.

The first base electrode layer 50A and the second base electrode layer 50B of the present example embodiment are fired layers. The fired layer preferably includes a metal component and either a glass component or a ceramic component, or both. The metal component may include, for example, at least one of Cu, Ni, Ag, Pd, Ag—Pd alloy, or Au. The glass component may include, for example, at least one of B, Si, Ba, Mg, Al, or Li. The ceramic component may use the same ceramic material as the dielectric layer 20 or a different type of ceramic material. Examples of the ceramic component include at least one selected from $CaZrO_3$ (calcium zirconate), CaTiO (calcium titanate), $SrTiO_3$ (strontium titanate), $BaZrO_3$ (proton-conductive metal oxide), or titanium dioxide ($TiO_2$), etc.

The fired layer is preferably formed by applying a conductive paste including glass and metal to the multilayer body 10, followed by firing. The fired layer can be formed by simultaneously firing a pre-firing multilayer chip, which is a material of the multilayer body 10 including the plurality of internal electrode layers and dielectric layers, and the conductive paste applied to the multilayer chip. Alternatively, the fired layer can be formed by obtaining the multilayer body 10 by firing the multilayer chip and then applying the conductive paste to the multilayer body 10, followed by firing. In the case as described above, the fired layer is preferably formed by firing a mixture including ceramic material instead of a glass component. In this case, as the ceramic material to be added, using a ceramic material similar to the dielectric layer 20 is particularly preferable. The fired layer may be a plurality of layers.

The thickness of the first base electrode layer 50A provided on the first end surface LS1 in the length direction L is, for example, preferably approximately between about 3 μm and about 200 μm inclusive at the center of the first base electrode layer 50A in the lamination direction T and the width direction W.

The thickness of the second base electrode layer 50B provided on the second end surface LS2 in the length direction L is, for example, preferably approximately between about 3 μm and about 200 μm inclusive at the center of the second base electrode layer 50B in the lamination direction T and the width direction W.

In cases where the first base electrode layer 50A is also provided on a portion of at least one of the first main surface TS1 or the second main surface TS2, the thickness of the first base electrode layer 50A provided in this portion in the lamination direction T is, for example, preferably approximately between about 3 μm and about 25 μm inclusive at the center of the first base electrode layer 50A provided in this portion in the length direction L and the width direction W.

In cases where the first base electrode layer 50A is also provided on a portion of at least one of the first lateral surface WS1 or the second lateral surface WS2, the thickness of the first base electrode layer 50A provided in this portion in the width direction W is, for example, preferably approximately between about 3 μm and about 25 μm inclusive at the center of the first base electrode layer 50A provided in this portion in the length direction L and the lamination direction T.

In cases where the second base electrode layer 50B is also provided on a portion of at least one of the first main surface TS1 or the second main surface TS2, the thickness of the second base electrode layer 50B provided in this portion in the lamination direction T is, for example, preferably approximately between about 3 μm and about 25 μm inclusive at the center of the second base electrode layer 50B provided in this portion in the length direction L and the width direction W.

In cases where the second base electrode layer 50B is also provided on a portion of at least one of the first lateral surface WS1 or the second lateral surface WS2, the thickness of the second base electrode layer 50B provided in this portion in the width direction W is, for example, preferably approximately between about 3 μm and about 25 μm inclusive at the center of the second base electrode layer 50B provided in this portion in the length direction L and the lamination direction T.

In the present example embodiment, the first base electrode layer 50A and the second base electrode layer 50B may be thin film layers. A thin film layer is a layer of accumulated metal particles.

The first base electrode layer 50A and the second base electrode layer 50B, when formed as thin film layers, are preferably formed using a thin film formation method such as a sputtering or vapor deposition method. Here, sputtering electrodes formed by the sputtering method are described.

The first base electrode layer 50A of the present example embodiment may include a first thin film layer formed of a sputtering electrode. The second base electrode layer 50B may include a second thin film layer formed of a sputtering electrode. When forming the base electrode layer with the sputtering electrode, the sputtering electrode is preferably directly formed on at least a portion of either the first main surface TS1 or the second main surface TS2 of the multilayer body 10. The first thin film layer formed of the sputtering electrode is provided on a portion of the first main surface TS1 on the first lateral surface WS1 side. The second thin film layer formed of the sputtering electrode is provided on a portion of the first main surface TS1 on the second lateral surface WS2 side.

The thin film layer formed of the sputtering electrode preferably includes at least one type of metal selected from a group including Mg, Al, Ti, W, Cr, Cu, Ni, Ag, Co, Mo, or V. As a result, the strength of fixing the external electrodes 40 to the multilayer body 10 can be enhanced. The thin film layer may include a single layer or a plurality of layers. For example, the thin film layer may include a two-layer structure including a Ni—Cr alloy layer and a Ni—Cu alloy layer.

The first plated layer 60A is provided to cover the first base electrode layer 50A.

The second plated layer 60B is provided to cover the second base electrode layer 50B.

The first plated layer 60A and the second plated layer 60B may include at least one selected from Cu, Ni, Sn, Ag, Pd, Ag—Pd alloy, or Au. The first plated layer 60A and the second plated layer 60B may include a plurality of layers. The first plated layer 60A and the second plated layer 60B preferably include a two-portion structure in which a Sn plated layer is formed on top of a Ni plated layer.

In the present example embodiment, the first plated layer 60A includes a first Ni plated layer 61A, and a first Sn plated layer 62A on the first Ni plated layer 61A.

In the present example embodiment, the second plated layer 60B includes a second Ni plated layer 61B, and a second Sn plated layer 62B on the second Ni plated layer 61B.

The Ni plated layer prevents the first base electrode layer 50A and the second base electrode layer 50B from being eroded by solder when mounting the multilayer ceramic capacitor 1. The Sn plated layer improves the wettability of solder when mounting the multilayer ceramic capacitor 1. As a result, the multilayer ceramic capacitor 1 can be easily mounted. The thickness of the first Ni plated layer 61A, the first Sn plated layer 62A, the second Ni plated layer 61B, and the second Sn plated layer 62B is preferably between about 2 μm and about 10 μm inclusive, for example.

The external electrodes 40 of the present example embodiment may include a conductive resin layer including conductive particles and thermosetting resin. The conductive resin layer may be provided to cover the fired layer. In the case where the conductive resin layer covers the fired layer, the conductive resin layer is provided between the fired layer and the plated layers (the first plated layer 60A, the second plated layer 60B). The conductive resin layer may completely cover the fired layer or partly cover the fired layer.

A conductive resin layer including thermosetting resin is more flexible than a conductive layer formed from a plating film or a fired conductive paste. Therefore, the conductive resin layer functions as a cushioning layer, even if the multilayer ceramic capacitor 1 is subjected to physical shock or thermal-cycling shock. Therefore, the conductive resin layer reduces or prevents the occurrence of cracks in the multilayer ceramic capacitor 1.

The metals defining the conductive particles may be Ag, Cu, Ni, Sn, or Bi, or alloys including them. The conductive particles preferably include Ag (silver). The conductive particles are, for example, a metallic powder of Ag. Ag has the lowest specific resistance among metals, thus is suitable as an electrode material. Ag being a noble metal is resistant to oxidation and has high weather resistance. Therefore, a metallic powder of Ag is suitable as conductive particles.

The conductive particles may be metal powders coated with Ag on the surfaces thereof. When using a metal powder coated with Ag, the metal powder is preferably Cu, Ni, Sn, Bi, or their alloy powder. Ag-coated metal powders are preferably used in order to maintain the properties of Ag while controlling the cost of base metal.

The conductive particles may be Cu or Ni subjected to antioxidant treatment. The conductive particles may be metal powder coated with Sn, Ni, Cu on the surfaces thereof. When using metal powder coated with Sn, Ni, or Cu, the metal powder is preferably Ag, Cu, Ni, Sn, or Bi, or their alloy powders.

The shape of the conductive particles is not particularly limited. Conductive particles can be of various shapes, including spherical and flat shapes, but it is preferable to use a mixture of spherical metal powders and flat metal powders.

The conductive particles included in the conductive resin layer primarily serve to ensure the conductivity of the conductive resin layer. Specifically, a plurality of conductive particles touching each other define conductive pathways within the conductive resin layer.

The resin of the conductive resin layer may include at least one selected from various known thermosetting resins, such as epoxy resin, phenolic resin, urethane resin, silicone resin, or polyimide resin, among others. Among these, epoxy resin, known for its excellent heat resistance, moisture resistance, and adhesiveness, is one of the most suitable resins. The resin of the conductive resin layer preferably includes a curing agent along with the thermosetting resin. When using epoxy resin as the base resin, the curing agent for epoxy resin may be one of various known compounds, such as phenolic, amine, anhydride, imidazole, active ester, or amid-imide type.

The conductive resin layer may include a plurality of layers. The thickest a portion of the conductive resin layer is preferably between about 10 μm and about 150 μm inclusive, for example.

The first plated layer 60A and the second plated layer 60B may be directly provided on the multilayer body 10, instead of providing the first base electrode layer 50A and the second base electrode layer 50B. In other words, the multilayer ceramic capacitor 1 may include plated layers directly electrically connected to the first internal electrode layer 31 and the second internal electrode layer 32. In such cases, a catalyst may be applied to the surface of the multilayer body 10 as a pretreatment, followed by forming the plated layers.

Even in this case, the plated layers are preferably a plurality of layers. The base plated layers and the top plated layers may each include at least one type of metal or alloy selected from, for example, Cu, Ni, Sn, Pb, Au, Ag, Pd, Bi, or Zn. The base plated layer is more preferably formed using Ni, which has solder barrier properties. The top plated layer is more preferably formed using Sn or Au, known for good solder wettability. For instance, when the first internal electrode layer 31 and the second internal electrode layer 32 are formed using Ni, the base plated layer is preferably formed using Cu, which bonds well with Ni. The top plated layer may be formed as needed, and the external electrodes 40 may consist solely of the base plated layers. The plated layer may include the top plated layer as the outermost layer, or may further include another plated layer on the surface of the top plated layer.

The thickness of each of the plated layers, when provided without a base electrode layer, is preferably between about 2 μm and about 10 μm inclusive, for example. The plated layer preferably does not include glass. The metal ratio per unit volume of the plated layer is preferably about 99 volume % or higher, for example.

Direct formation of the plated layer on the multilayer body 10 can reduce the thickness of the base electrode layer. Thus, reducing the thickness of the base electrode layer allows for a reduction in the dimension of the multilayer ceramic capacitor 1 in the lamination direction T, allowing for shortening the height of the multilayer ceramic capacitor 1. Alternatively, the reduction in the thickness of the base electrode layer allows for an increase in the thickness of the dielectric layer 20 interposed between the first internal electrode layer 31, the second internal electrode layer 32, and the intermediate electrode layer 33, improving the body thickness. As such, direct formation of the plated layer on the multilayer body 10 enhances the design flexibility of the multilayer ceramic capacitor.

The basic configuration of the multilayer ceramic capacitor 1 according to the current example embodiment has been described above. The dimension of the multilayer ceramic capacitor 1 including the multilayer body 10 and the external electrodes 40 in the length direction, referred to as the L dimension, is preferably between about 0.2 mm and about 10 mm inclusive, for example. The dimension of the multilayer ceramic capacitor 1 in the lamination direction, referred to as the T dimension, is preferably between about 0.1 mm and about 10 mm inclusive, for example. The dimension of the multilayer ceramic capacitor 1 in the width direction, referred to as the W dimension, is preferably between about 0.1 mm and about 10 mm inclusive, for example.

Figure 5:
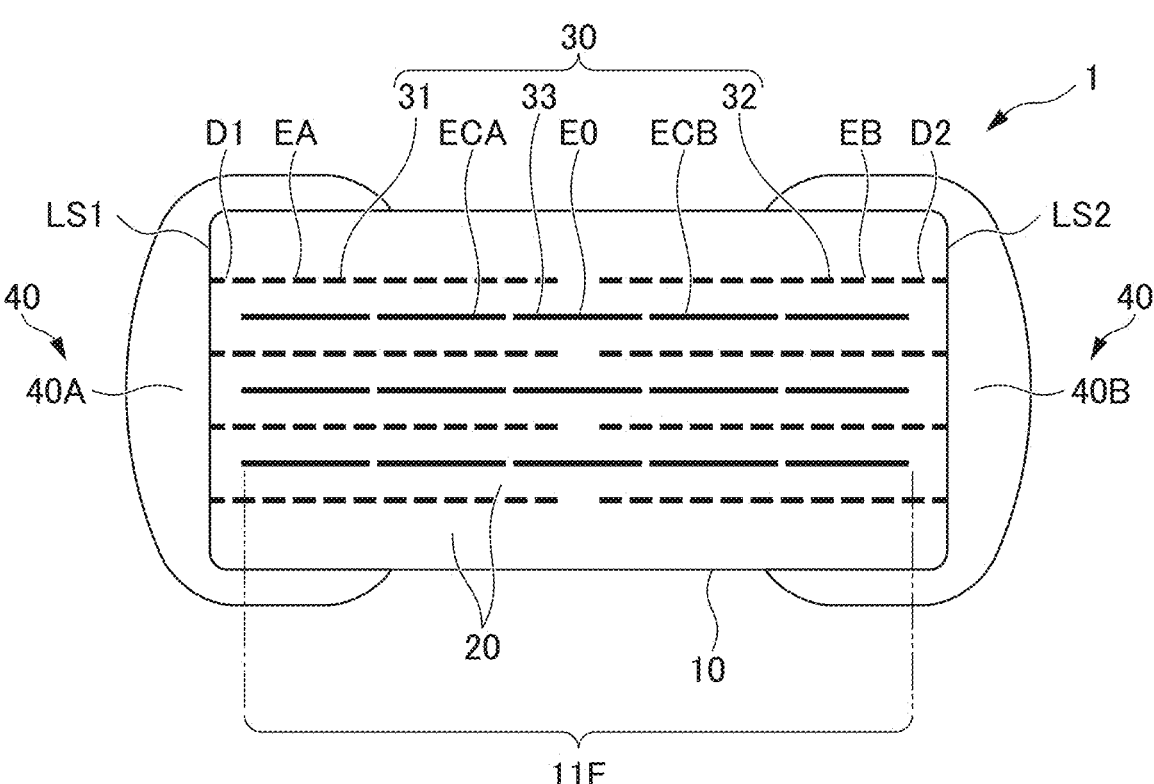
FIG. 5 is a schematic cross-sectional view illustrating a configuration in which the coverage of the intermediate electrode layer is increased in the internal electrode layers of the multilayer ceramic capacitor according to the first example embodiment of the present invention.

Details of the present example embodiment will be further described using FIGS. 1 to 5. FIG. 5 is a schematic cross-sectional view illustrating the configuration in which the coverage of the intermediate electrode layer 33 is increased in the internal electrode layers 30 of the multilayer ceramic capacitor 1 according to the first example embodiment.

In the multilayer ceramic capacitor 1 according to the present example embodiment, the coverage of the intermediate electrode layer 33 is higher than the coverage of both the first internal electrode layer 31 and the second internal electrode layer 32. The internal electrode layer 30 includes the metal material and the hollow portions without metal material. Here, a proportion of the metal material in the internal electrode layer 30 is described as a coverage. A coverage is also referred to as a coverage rate of the internal electrode layer 30 over the dielectric layer 20. The hollow portions without metal material may include ceramic components such as dielectric materials, or glass components such as silica. The hollow portions without metal material may be voids.

For instance, in the multilayer ceramic capacitor 1 according to the present example embodiment, the coverage of both the first internal electrode layer 31 and the second internal electrode layer 32 is preferably less than about 85%, and more preferably between about 60% and about 80% inclusive, for example. The coverage of the intermediate electrode layer 33 is preferably about 90% or higher, and more preferably about 95% or higher, for example. The coverage of the intermediate electrode layer 33 is preferably at least about 10 percentage points higher, and more preferably at least about 15 percentage points higher than the coverage of both the first internal electrode layer 31 and the second internal electrode layer 32.

In the multilayer ceramic capacitor 1 according to the present example embodiment, the first internal electrode layer 31 and the second internal electrode layer 32 include a larger proportion of the hollow portions without metal, compared to the intermediate electrode layer 33. In other words, the proportion of metal material in the first internal electrode layer 31 and the second internal electrode layer 32 is smaller than the proportion of metal material in the intermediate electrode layer 33.

The hollow portions in the internal electrode layers 30 facilitate the formation of ceramic pillar structures that connect the two dielectric layers 20 interposing both surfaces of the internal electrode layer 30. Therefore, a lower coverage results in more pillar structures in the hollow portions, and the more pillar structures result in stronger coupling between the two dielectric layers 20. In this case, the internal electrode layer 30 is interposed between and firmly held by the two dielectric layers 20, reducing or preventing delamination at the interface between the two dielectric layers 20 and the internal electrode layer 30 interposed therebetween. Extra attention is required to prevent interface delamination, especially at the first extension portion D1 and the second extension portion D2 (extension electrode portions), which may be the starting points for infiltration of moisture or plating solutions.

Therefore, in the present example embodiment, the coverage of the first internal electrode layer 31 and the second internal electrode layer 32 including the extension electrode portions is lowered, thus increasing the coverage of the intermediate electrode layer 33, while improving the interface adhesive strength between the internal electrode layers 30 and the dielectric layers 20, thus enhancing the capacitance. Thus, the high-withstand-voltage and two-portion-structured multilayer ceramic capacitor according to the present example embodiment can reduce or prevent interface delamination while decreasing or minimizing the reduction in capacitance.

Here, the relationship between the coverage of the first internal electrode layer 31, the second internal electrode layer 32, and the intermediate electrode layer 33 is described in further detail.

As mentioned before, in the multilayer ceramic capacitor 1 according to the present example embodiment, the coverage of the intermediate electrode layer 33 is higher than the coverage of both the first internal electrode layer 31 and the second internal electrode layer 32. For example, the coverage of both the first counter portion EA and the first extension portion D1 of the first internal electrode layer 31 is preferably lower than the coverage of the first electrode layer-side counter portion ECA of the intermediate electrode layer 33. The coverage of both the second counter portion EB and the second extension portion D2 of the second internal electrode layer 32 is preferably lower than the coverage of the second electrode layer-side counter portion ECB of the intermediate electrode layer 33. For instance, the coverage of the first counter portion EA and the coverage of the first extension portion D1 may be substantially the same coverage, which is lower than the coverage of the first electrode layer-side counter portion ECA. The coverage of the second counter portion EB and the second extension portion D2 may be substantially the same coverage, which is lower than the coverage of the second electrode layer-side counter portion ECB. As a result, the manufacturing process for the first internal electrode layer 31 and the second internal electrode layer 32 can be prevented from becoming complicated. The coverage of the first counter portion EA may be higher than the coverage of the first extension portion D1. The coverage of the second counter portion EB may be higher than the coverage of the second extension portion D2. As a result, the capacitance can be enhanced, while reducing or preventing interface delamination. The coverage of the first counter portion EA may be higher than the coverage of the first extension portion D1 but lower than the coverage of the first electrode layer-side counter portion ECA. The coverage of the second counter portion EB may be higher than the coverage of the second extension portion D2 but lower than the coverage of the second electrode layer-side counter portion ECB.

The coverage of the first electrode layer-side counter portion ECA of the intermediate electrode layer 33 is higher than the coverage of the first counter portion EA of the first internal electrode layer 31. The coverage of the second electrode layer-side counter portion ECB of the intermediate electrode layer 33 is higher than the coverage of the second counter portion EB of the second internal electrode layer 32. As such, the coverage of at least one of the pair of counter portions that define the capacitor defining portions is increased, thus decreasing or minimizing the reduction in capacitance.

The coverage of the first electrode layer-side counter portion ECA of the intermediate electrode layer 33 is higher than the coverage of the first extension portion D1 of the first internal electrode layer 31. The coverage of the second electrode layer-side counter portion ECB of the intermediate electrode layer 33 is higher than the coverage of the second extension portion D2 of the second internal electrode layer 32. This allows for reducing or preventing interface delamination, while decreasing or minimizing the reduction in capacitance.

The coverage of the coupling portion E0 of the intermediate electrode layer 33 is higher than the coverage of the first counter portion EA of the first internal electrode layer 31 and the coverage of the second counter portion EB of the second internal electrode layer 32. The coverage of the coupling portion E0 of the intermediate electrode layer 33 is higher than the coverage of the first extension portion D1 of the first internal electrode layer 31 and the coverage of the second extension portion D2 of the second internal electrode layer 32. This ensures a more stable electrical series connection of the plurality of capacitor defining portions. The constant coverage and thickness of the intermediate electrode layer 33 can prevent the manufacturing process from becoming complicated. The coverage of the first electrode layer-side counter portion ECA of the intermediate electrode layer 33, and the coverage of the coupling portion E0 and the second electrode layer-side counter portion ECB of the intermediate electrode layer 33 may be approximately the same coverage.

Measurement Method for Coverage

The following describes an example of a method of measuring the coverage of the internal electrode layers 30 over the dielectric layers 20, also referred to as the coverage rate. The measurement of coverage in the present measurement method is also referred to as measurement of line coverage.

First, the multilayer ceramic capacitor 1 is polished from either the first lateral surface WS1 side or the second lateral surface WS2 side, to expose the LT cross section where the series capacitor defining portion 11E of the multilayer body 10 is exposed. If necessary, the LT cross section exposed at the observation position is etched to remove the internal electrode layers 30 elongated by polishing. A Scanning Electron Microscope (SEM) is used to observe the central portion of the exposed LT cross section in the width direction W, specifically at the measurement points M1 to M5 (to be described later).

The measurement points are set in the L gaps, the effective capacitor active portions, and the intermediate gaps. In the present example embodiment, the measurement points M1 to M5 are set at the first end surface-side outer layer portion LG1 and the second end surface-side outer layer portion LG2 as the L gaps, the first capacitor portion CAP1 and the second capacitor portion CAP2 as the effective capacitor active portions, and the intermediate gaps including the coupling portion E0. The measurement points M1 to M5 are set at the center of the exposed LT cross section in the lamination direction T.

The measurement point M1 is set in the region including the extension portion D1 of the first internal electrode layer 31. Specifically, the measurement point M1 is set at the center of the extension portion D1 in the length direction L.

The measurement point M2 is set in the region including the first counter portion EA of the first internal electrode layer 31 in the first capacitor portion CAP1, and the first electrode layer-side counter portion ECA of the intermediate electrode layer 33. Specifically, the measurement point M2 is set at the center of the first counter portion EA and the first electrode layer-side counter portion ECA defining the first capacitor portion CAP1 in the length direction L.

The measurement point M3 is set in the region including the coupling portion E0 of the intermediate electrode layer 33 in the intermediate gap. Specifically, the measurement point M3 is set at the center of the coupling portion E0 in the length direction L.

The measurement point M4 is set in the region including the second counter portion EB of the second internal electrode layer 32 in the second capacitor portion CAP2, and the second electrode layer-side counter portion ECB of the intermediate electrode layer 33. Specifically, measurement point M4 is set at the center of the second counter portion EB and the second electrode layer-side counter portion ECB defining the second capacitor portion CAP2 in the length direction L.

The measurement point M5 is set in the region including the extension portion D2 of the second internal electrode layer 32 at the second end surface-side outer layer portion LG2. Specifically, measurement point M5 is set at the center of the extension portion D2 in the length direction L.

In the case of a multilayer ceramic capacitor with a three- or more-portion structure to be described in subsequent example embodiments, the measurement points are preferably set in the areas based on the structure, and also preferably set in the L gaps, the capacitor active portions, and the intermediate gaps, as in the case of the present example embodiment.

In the exposed LT cross section, the line coverage is measured using an optical microscope. The line coverage is measured at the measurement points M1 to M5. The observation magnification for viewing each measurement point is set at 1000×.

The internal electrode layers 30 includes areas with conductive components, and areas without conductive components, such as hollow portions. The line coverage is calculated as the ratio of the length of the region occupied by the conductive components that actually constitute the internal electrode layer 30 in the length direction L, to the total length of the internal electrode layer 30 in the length direction L, disregarding the presence or absence of the conductive components. In other words, the line coverage is calculated as the ratio of the length in the length direction L, excluding the region without the conductive components, to the total length of the internal electrode layer 30 in the length direction L, disregarding the presence or absence of the conductive components. The coverage of the first internal electrode layer 31, the second internal electrode layer 32, and the intermediate electrode layer 33 existing at each measurement point is measured. An average value is taken for each of the first internal electrode layer 31, the second internal electrode layer 32, and the intermediate electrode layer 33. This each average value is taken as the coverage of each of the first internal electrode layer 31, the second internal electrode layer 32, and the intermediate electrode layer 33 in the present example embodiment.

For example, when measuring the coverage of the first internal electrode layer 31, the coverage of the first internal electrode layer 31 is measured at the measurement points M1 and M2, and the average of these measurements is taken as the coverage of the first internal electrode layer 31 in the present example embodiment. Similarly, when measuring the coverage of the second internal electrode layer 32, the coverage of the second internal electrode layer 32 is measured at the measurement points M4 and M5, and the average of these measurements is taken as the coverage of the coverage of the second internal electrode layer 32 in the present example embodiment. When measuring the coverage of the intermediate electrode layer 33, the coverage of the intermediate electrode layer 33 is measured at the measurement points M2, M3, and M4, and the average of these measurements is taken as the coverage of the intermediate electrode layer 33 in the present example embodiment.

Manufacturing Method

Next, an example of a method of manufacturing the multilayer ceramic capacitor 1 of the present example embodiment is described. The method of manufacturing the multilayer ceramic capacitor 1 of the present example embodiment is not limited, as long as the requirements mentioned above are satisfied. However, a preferable manufacturing method includes the following steps. The steps are described in detail below.

A dielectric sheet for the dielectric layer 20 and a conductive paste for the internal electrode layer 30 are prepared. The dielectric sheet, and the conductive paste for the internal electrode layer include binders and solvents. The binders and solvents may be any known ones.

The conductive paste for the internal electrode layer 30 is printed in a predetermined pattern on the dielectric sheet, for example, by screen printing or gravure printing. As a result, a dielectric sheet with a pattern of the first internal electrode layer 31 and the second internal electrode layer 32, and a dielectric sheet with a pattern of the intermediate electrode layer 33 are prepared. The coverages of the first internal electrode layer 31, the second internal electrode layer 32, and the intermediate electrode layer 33 are adjusted by stacking dielectric sheets with different application thicknesses. For instance, in order to achieve higher coverage for the intermediate electrode layer 33, the thickness of the conductive paste serving as the intermediate electrode layer 33 is made thicker than the thickness of the conductive paste serving as the first internal electrode layer 31 and the second internal electrode layer 32. The printing method is not limited to screen printing, etc.

The conductive paste serving as the intermediate electrode layer 33 may be applied in a substantially uniform thickness to achieve substantially thickness and coverage throughout the intermediate electrode layer 33. The conductive paste serving as the first internal electrode layer 31 may be applied in a substantially uniform thickness to achieve substantially consistent thickness and coverage throughout the first internal electrode layer 31. The conductive paste serving as the second internal electrode layer 32 may be applied in a substantially uniform thickness to achieve substantially consistent thickness and coverage throughout the second internal electrode layer 32. This approach can prevent the manufacturing process from becoming complicated. In order to achieve substantially the same coverage of the first internal electrode layer 31 and the second internal electrode layer 32, the thickness of the conductive paste serving as the first internal electrode layer 31 and the thickness of the conductive paste serving as the second internal electrode layer 32 may be made substantially the same thickness. This approach can prevent the manufacturing process from becoming complicated. However, this is not the only approach.

The multilayer sheet is pressed in the height direction, for example, via hydrostatic pressure pressing or other methods, to produce a multilayer block.

The multilayer block is cut into multilayer chips of a predetermined size. In this case, the multilayer chips may be polished, for example, by barrel polishing, to round the corners and edges.

The multilayer chips are fired to produce the multilayer body 10. The firing temperature is preferably, for example, between about 900° C. and about 1400° C. inclusive, depending on the materials of the dielectric layer 20 and the internal electrode layer 30.

A conductive paste, which will serve as the base electrode layers, is applied to both end surfaces of the multilayer body 10.

In the present example embodiment, the base electrode layer is a fired layer. The conductive paste including glass components and metal is applied to the multilayer body 10, for example, by dipping. Subsequently, the base electrode layer is formed through a firing process. The firing temperature in this case is preferably between about 700° C. and about 900° C. inclusive, for example.

In the cases of simultaneously firing the pre-firing multilayer chip and the conductive paste applied to the multilayer chips, the fired layer is preferably formed by firing a material including a ceramic material instead of glass components. In this case, as the ceramic material to be added, a ceramic material of the same type as the dielectric layer 20 is particularly preferably used. In this case, a conductive paste is applied to the pre-firing multilayer chips, and the multilayer chips as well as the conductive paste applied to the multilayer chips are simultaneously fired, thus forming the multilayer body 10 with the fired layers.

Subsequently, a plated layer is formed on the surface of the base electrode layers. In the present example embodiment, the first plated layer 60A is formed on the surface of the first base electrode layer 50A. The second plated layer 60B is formed on the surface of the second base electrode layer 50B. In the present example embodiment, a Ni plated layer and a Sn plated layer are formed as the plated layers. For the plating process, either electrolytic plating or electroless plating may be used.

However, electroless plating requires pretreatment with catalysts to improve the plating deposition rate, involving a drawback to increase complexity of the steps. Therefore, electrolytic plating is preferred in most cases. The Ni plated layer and the Sn plated layer are sequentially formed, for example, by barrel plating.

The conductive resin layer, when provided as the base electrode layer, may be provided to cover the fired layer. In the case of providing a conductive resin layer, a conductive resin paste including thermosetting resin and metal components is applied onto the fired layer, followed by heat treatment at temperature ranging from about 250° C. to about 550° C. or higher, for example. This process causes the thermosetting resin to cure, forming the conductive resin layer. The atmosphere during this heat treatment is preferably an $N_2$ environment. The oxygen concentration is preferably about 100 ppm or lower in order to prevent the resin from dispersing and prevent the various metal components from oxidating.

The multilayer ceramic capacitor 1 may be manufactured through such manufacturing processes, for example.

Example embodiments of the present invention are not limited to the two-portion-structured multilayer ceramic capacitors 1, but can be widely applied to multilayer ceramic capacitors with a series structure.

Second Example Embodiment

Figure 6:
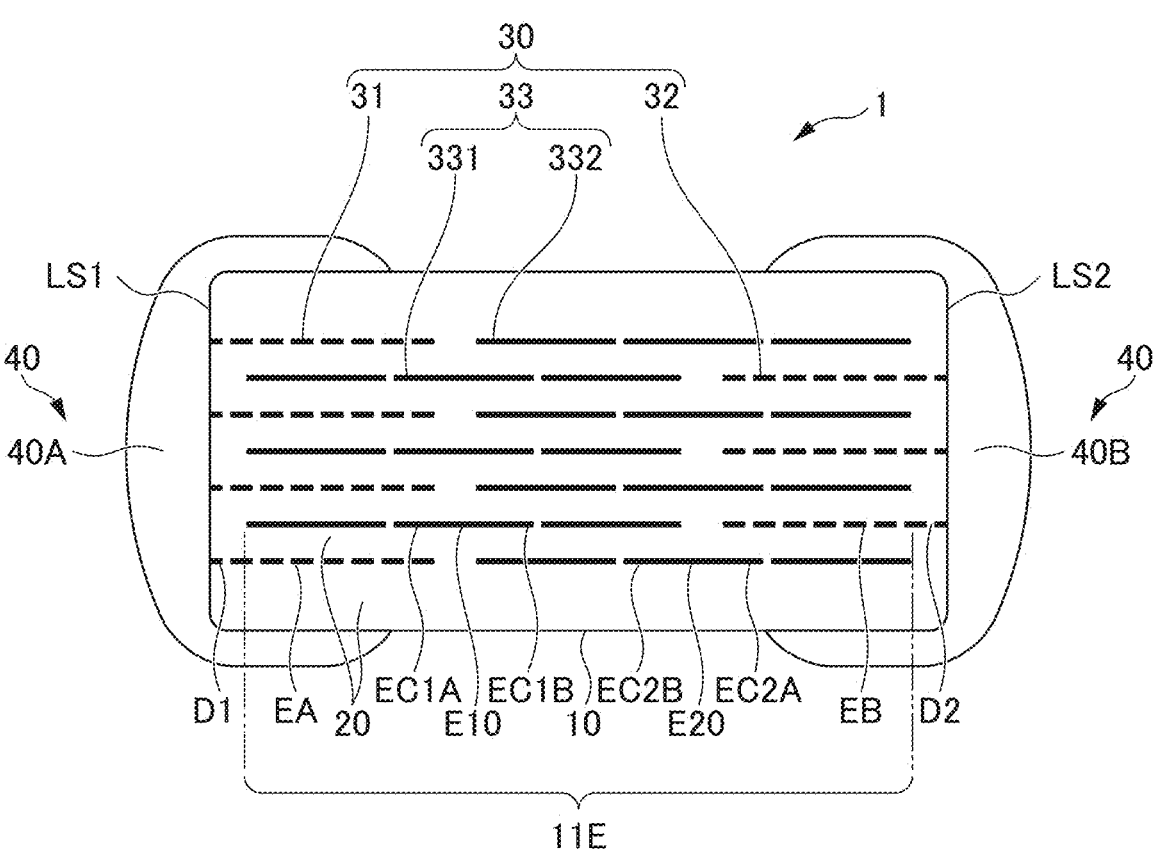
FIG. 6 is a schematic cross-sectional view illustrating a configuration in which the coverage of the intermediate electrode layer is increased in the internal electrode layers of the multilayer ceramic capacitor according to a second example embodiment of the present invention.

The multilayer ceramic capacitor 1 according to a second example embodiment is a three-portion-structured multilayer ceramic capacitor. The following describes the multilayer ceramic capacitor 1 of the second example embodiment with reference to FIG. 6. Detailed description of components identical to those of the first example embodiment may be omitted below. FIG. 6 is a schematic cross-sectional view illustrating the configuration in which the coverage of the intermediate electrode layer 33 is increased in the internal electrode layers 30 of the multilayer ceramic capacitor 1 according to the second example embodiment. The manufacturing method in the second example embodiment is similar to that in the first example embodiment, description of which is omitted here.

In the multilayer ceramic capacitor 1 of the present example embodiment, the configuration of the internal electrode layers 30 inside the multilayer body 10 differs from that of the first example embodiment. Specifically, while the multilayer ceramic capacitor 1 of the first example embodiment includes a two-portion structure, the multilayer ceramic capacitor 1 of the second example embodiment includes a three-portion structure of the internal electrode layers 30, and the aspect of the internal electrode layers 30 inside the multilayer body 10 differs from that of the first example embodiment.

The plurality of internal electrode layers 30 include the plurality of first internal electrode layers 31 as the plurality of first inner conductive layers, the plurality of second internal electrode layers 32 as the plurality of second inner conductive layers, and the intermediate electrode layer 33.

As illustrated in FIG. 6, the intermediate electrode layer 33 of the second example embodiment includes a first intermediate electrode layer 331 and a second intermediate electrode layer 332.

The first intermediate electrode layer 331 includes a first electrode layer-side counter portion EC1A, a first intermediate electrode layer counter portion EC1B, and a first coupling portion E10. The first electrode layer-side counter portion EC1A is a region facing the first internal electrode layer 31 adjacent in the lamination direction T, provided inside the multilayer body 10. The first intermediate electrode layer counter portion EC1B is a region facing the second intermediate electrode layer 332 adjacent in the lamination direction T, provided inside the multilayer body 10. The first coupling portion E10 is a portion connecting the first electrode layer-side counter portion EC1A with the first intermediate electrode layer counter portion EC1B, and is provided between the first electrode layer-side counter portion EC1A and the first intermediate electrode layer counter portion EC1B.

The second intermediate electrode layer 332 includes a second electrode layer-side counter portion EC2A, a second intermediate electrode layer counter portion EC2B, and a second coupling portion E20. The second electrode layer-side counter portion EC2A faces the second internal electrode layer 32 adjacent in the lamination direction T. The second intermediate electrode layer counter portion EC2B faces the first intermediate electrode layer 331 adjacent in the lamination direction T. The second coupling portion E20 is a portion connecting the second electrode layer-side counter portion EC2A with the second intermediate electrode layer counter portion EC2B, and is provided between the second electrode layer-side counter portion EC2A and the second intermediate electrode layer counter portion EC2B.

As illustrated in FIG. 6, in the multilayer ceramic capacitor 1 according to the second example embodiment, the first internal electrode layer 31 and the second intermediate electrode layer 332 are provided adjacent in the length direction L. In the multilayer ceramic capacitor 1 of the second example embodiment, the second internal electrode layer 32 and the first intermediate electrode layer 331 are provided adjacent in the length direction L.

In the multilayer ceramic capacitor 1 of the second example embodiment, the first internal electrode layer 31 and the second intermediate electrode layer 332 are stacked alternately to overlap the second internal electrode layer 32 and the first intermediate electrode layer 331, interposing the dielectric layers 20.

In the present example embodiment, the first counter portion EA and the first electrode layer-side counter portion EC1A face each other, interposing the dielectric layer 20, thus generating the capacitance CAP1 (first capacitor portion CAP1). The second counter portion EB and the second electrode layer-side counter portion EC2A face each other, interposing the dielectric layer, thus generating the capacitance CAP2 (second capacitor portion CAP2). The first intermediate electrode layer counter portion EC1B and the second intermediate electrode layer counter portion EC2B face each other, interposing the dielectric layer 20, thus generating the capacitance CAP3 (third capacitor portion CAP3). The first coupling portion E10 serially connects the capacitance CAP1 and the capacitance CAP3. The second coupling portion E20 serially connects the capacitance CAP2 and the capacitance CAP3. The multilayer ceramic capacitor 1 of the present example embodiment is a so-called three-portion-structured series-structured multilayer ceramic capacitor 1, in which three capacitor portions are serially connected.

The multilayer body 10 includes a series capacitor defining portion 11E. The series capacitor defining portion 11E includes a portion generating the capacitance CAP1, a portion generating the capacitance CAP2, a portion generating the capacitance CAP3, a portion serially connecting the capacitances CAP1 and CAP3, and a portion serially connecting the capacitances CAP2 and CAP3. The series capacitor defining portion 11E is a portion of the inner layer portion 11. In the series capacitor defining portion 11E, the portion generating the capacitance CAP1 (first capacitor portion CAP1), the portion generating the capacitance CAP2 (second capacitor portion CAP2), and the portion generating the capacitance CAP3 (third capacitor portion CAP3) are also referred to as the capacitor active portions.

The series capacitor defining portion 11E of the multilayer body 10 includes a first series connection region and a second series connection region. The first series connection region is a portion between the portion generating the capacitance CAP1 and the portion generating the capacitance CAP3, encompassing the dielectric layer 20 and the first coupling portion E10. The second series connection region is a portion between the portion generating the capacitance CAP2 and the portion generating the capacitance CAP3, encompassing the dielectric layer 20 and the second coupling portion E20. Thus, the first series connection region is a collective portion including a portion of the plurality of dielectric layers 20 overlapping the first coupling portion E10 as viewed from the lamination direction T, and the plurality of first coupling portions E10. The second series connection region is a collective portion including a portion of the plurality of dielectric layers 20 overlapping the second coupling portion E20 as viewed from the lamination direction T, and the plurality of second coupling portions E20.

As illustrated in FIG. 6, the external electrodes 40 include the first external electrode 40A on the first end surface LS1 side of the multilayer body 10, and the second external electrode 40B on the second end surface LS2 side of the multilayer body 10.

The first coupling portion E10 serially connects the capacitance CAP1 and the capacitance CAP3. The second coupling portion E20 serially connects the capacitance CAP2 and the capacitance CAP3. Therefore, capacitor characteristics of the series-connected capacitance manifest between the first external electrode 40A connected to the first internal electrode layer 31 and the second external electrode 40B connected to the second internal electrode layer 32.

In the multilayer ceramic capacitor 1 according to the second example embodiment as well, the coverage of the intermediate electrode layer 33 is higher than the coverage of the first internal electrode layer 31 and the second internal electrode layer 32. More specifically, the coverage of the first intermediate electrode layer 331 and the second intermediate electrode layer 332 is higher than the coverage of the first internal electrode layer 31 and the second internal electrode layer 32. For example, in the multilayer ceramic capacitor 1 according to the second example embodiment, the coverage of both the first internal electrode layer 31 and the second internal electrode layer 32 is preferably less than about 85%, and more preferably between about 60% and about 80% inclusive, for example. The coverage of the first intermediate electrode layer 331 and the second intermediate electrode layer 332 is preferably about 90% or more, and more preferably about 95% or more, for example. The coverage of the intermediate electrode layer 33 is preferably at least about 10 percentage points higher, and more preferably at least about 15 percentage points higher than the coverage of both the first internal electrode layer 31 and the second internal electrode layer 32.

In the multilayer ceramic capacitor 1 according to the present example embodiment, the coverage of the first intermediate electrode layer counter portion EC1B of the first intermediate electrode layer 331 and the coverage of the second intermediate electrode layer counter portion EC2B of the second intermediate electrode layer 332 are higher than the coverage of both the first internal electrode layer 31 and the second internal electrode layer 32. The first intermediate electrode layer counter portion EC1B of the first intermediate electrode layer 331 and the second intermediate electrode layer counter portion EC2B of the second intermediate electrode layer 332 face each other, thus defining the third capacitor portion CAP3. Therefore, the coverage of the internal electrode layers of the third capacitor portion CAP3 is higher than the coverage of both the first internal electrode layer 31 and the second internal electrode layer 32.

As a result, the high-withstand-voltage three-portion-structured multilayer ceramic capacitor according to the second example embodiment can enhance the capacitance, allowing for reducing or preventing interface delamination.

Third Example Embodiment

The multilayer ceramic capacitor 1 is not limited to the configurations illustrated in FIGS. 1 to 4B. For example, the multilayer ceramic capacitor 1 may also be a four-portion-structured multilayer ceramic capacitor as illustrated in FIG. 7.

Figure 7:
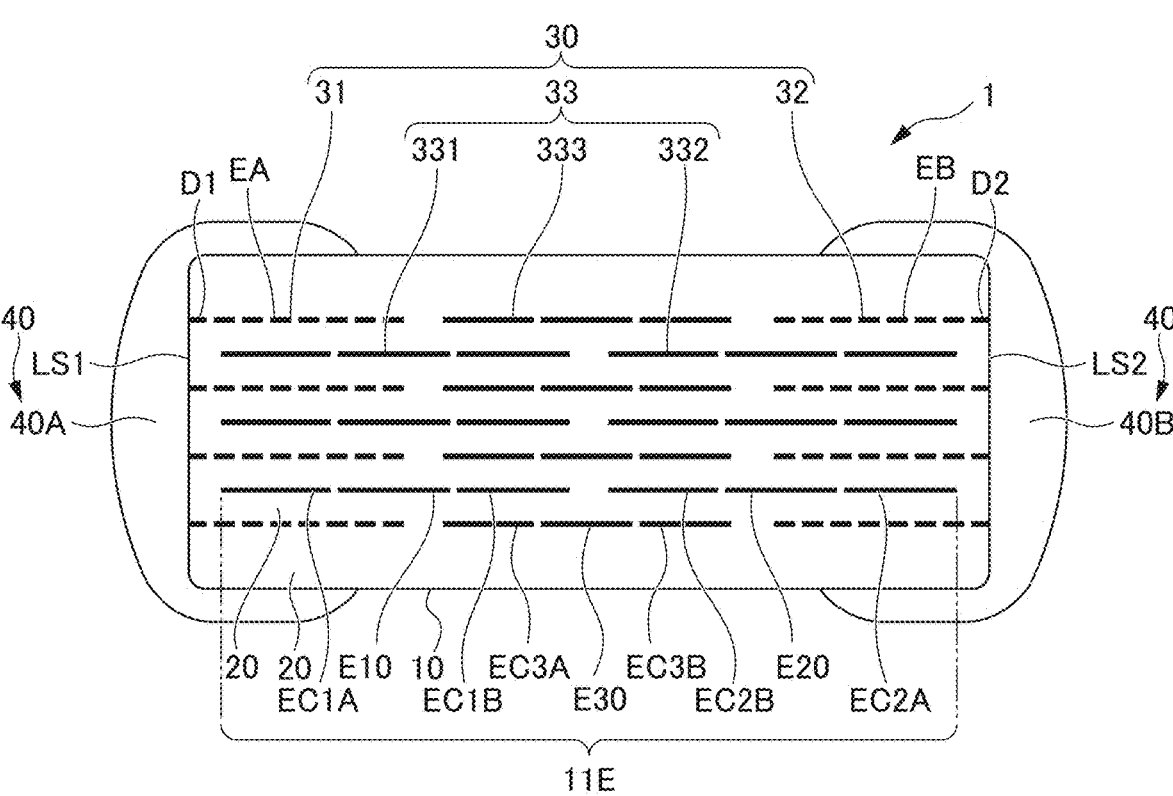
FIG. 7 is a schematic cross-sectional view illustrating a configuration in which the coverage of the intermediate electrode layer is increased in the internal electrode layers of the multilayer ceramic capacitor according to a third example embodiment of the present invention.

The following describes the multilayer ceramic capacitor 1 according to the third example embodiment with reference to FIG. 7. Detailed description of components identical to those of the first and second example embodiments are omitted below. An example of the method of manufacturing the multilayer ceramic capacitor of the third example embodiment is similar to the method of manufacturing the multilayer ceramic capacitor of the first example embodiment, description of which is omitted. FIG. 7 is a schematic cross-sectional view illustrating the configuration in which the coverage of the intermediate electrode layer 33 is increased in the internal electrode layers 30 of the multilayer ceramic capacitor 1 according to the third example embodiment.

In the multilayer ceramic capacitor 1 of the present example embodiment, the aspect of the internal electrode layers 30 and the external electrodes 40 inside the multilayer body 10 differs from that of the first example embodiment. Specifically, while the multilayer ceramic capacitor 1 of the first example embodiment includes the two-portion structure of the internal electrode layers 30, the multilayer ceramic capacitor 1 of the third example embodiment includes a four-portion structure of the internal electrode layers 30, and the aspect of the internal electrode layers 30 inside the multilayer body 10 differs from that of the first example embodiment.

The plurality of internal electrode layers 30 include: the plurality of first internal electrode layers 31 as the plurality of first inner conductive layers, the plurality of second internal electrode layers 32 as the plurality of second inner conductive layers, and the intermediate electrode layer 33.

As illustrated in FIG. 7, the intermediate electrode layer 33 includes a first intermediate electrode layer 331, a second intermediate electrode layer 332, and a third intermediate electrode layer 333.

The first intermediate electrode layer 331 includes the first electrode layer-side counter portion EC1A facing the first internal electrode layer 31 adjacent in the lamination direction T, the first intermediate electrode layer counter portion EC1B facing the third intermediate electrode layer 333 adjacent in the lamination direction T, and the first coupling portion E10.

The second intermediate electrode layer 332 includes the second electrode layer-side counter portion EC2A facing the second internal electrode layer 32 adjacent in the lamination direction T, the second intermediate electrode layer counter portion EC2B facing the third intermediate electrode layer 333 adjacent in the lamination direction T, and the second coupling portion E20.

The third intermediate electrode layer 333 includes the third intermediate electrode layer counter portion EC3A facing the first intermediate electrode layer 331 adjacent in the lamination direction T, the fourth intermediate electrode layer counter portion EC3B facing the second intermediate electrode layer 332 adjacent in the lamination direction T, and the third coupling portion E30.

As illustrated in FIG. 7, in the multilayer ceramic capacitor 1 according to the third example embodiment, the first internal electrode layer 31, the third intermediate electrode layer 333, and the second internal electrode layer 32 are provided adjacent in the length direction L. In the multilayer ceramic capacitor 1 according to the third example embodiment, the first intermediate electrode layer 331 and the second intermediate electrode layer 332 are provided adjacent in the length direction L.

In the multilayer ceramic capacitor 1 according to the third example embodiment, the first internal electrode layer 31, the third intermediate electrode layer 333, and the second internal electrode layer 32 are stacked alternately to overlap the first intermediate electrode layer 331 and the second intermediate electrode layer 332, interposing the dielectric layers 20.

In the present example embodiment, the first counter portion EA and the first electrode layer-side counter portion EC1A face each other, interposing the dielectric layer 20, thus generating the capacitance CAP1 (first capacitor portion CAP1). The second counter portion EB and the second electrode layer-side counter portion EC2A face each other, interposing the dielectric layer 20, thus generating the capacitance CAP2 (second capacitor portion CAP2). The first intermediate electrode layer counter portion EC1B and the third intermediate electrode layer counter portion EC3A face each other, interposing the dielectric layer 20, thus generating the capacitance CAP3 (third capacitor portion CAP3). The second intermediate electrode layer counter portion EC2B and the fourth intermediate electrode layer counter portion EC3B face each other, interposing the dielectric layer 20, thus generating the capacitance CAP4 (fourth capacitor portion CAP4)

The first coupling portion E10 serially connects the capacitance CAP1 and the capacitance CAP3. The second coupling portion E20 serially connects the capacitance CAP2 and the capacitance CAP4. The third coupling portion the E30 serially connects capacitance CAP3 and the capacitance CAP4. The multilayer ceramic capacitor 1 of the present example embodiment is a so-called four-portion-structured series-structured multilayer ceramic capacitor 1, in which four capacitor portions are serially connected.

The multilayer body 10 includes the series capacitor defining portion 11E. The series capacitor defining portion 11E includes the portion generating the capacitance CAP1, the portion generating the capacitance CAP2, the portion generating the capacitance CAP3, the portion generating the capacitance CAP4, the portion serially connecting the capacitances CAP1 and CAP3, and the portion serially connecting the capacitances CAP2 and CAP4, and the portion serially connecting the capacitances CAP3 and CAP4. The series capacitor defining portion 11E is a portion of the inner layer portion 11. In the series capacitor defining portion 11E, the portion generating the capacitance CAP1 (first capacitor portion CAP1), the portion generating the capacitance CAP2 (second capacitor portion CAP2), the portion generating the capacitance CAP3 (third capacitor portion CAP3), and the portion generating the capacitance CAP4 (fourth capacitor portion CAP4) are also referred to as the capacitor active portions.

The series capacitor defining portion 11E of the multilayer body 10 includes a first series connection region, a second series connection region, and a third series connection region. The first series connection region is a portion between the portion generating the capacitance CAP1 and the portion generating the capacitance CAP3, encompassing the dielectric layer 20 and the first coupling portion E10. The second series connection region is a portion between the portion generating the capacitance CAP2 and the portion generating the capacitance CAP4, encompassing the dielectric layer 20 and the second coupling portion E20. The third series connection region is a portion between the portion generating the capacitance CAP3 and the portion generating the capacitance CAP4, encompassing the dielectric layer 20 and the third coupling portion E30. Thus, the first series connection region is a collective portion including the plurality of dielectric layers 20 overlapping the first coupling portion E10 as viewed from the lamination direction T, and the plurality of first coupling portions E10. The second series connection region is a collective portion including the plurality of dielectric layers 20 overlapping the second coupling portion E20 as viewed from the lamination direction T, and the plurality of second coupling portions E20. The third series connection region is a collective portion including the plurality of dielectric layers 20 overlapping the third coupling portion E30 as viewed from the lamination direction T, and the plurality of third coupling portions E30.

As illustrated in FIG. 7, the external electrodes 40 include the first external electrode 40A on the first end surface LS1 side of the multilayer body 10, and the second external electrode 40B on the second end surface LS2 side of the multilayer body 10.

The first coupling portion E10 serially connects the capacitance CAP1 and the capacitance CAP3. The second coupling portion E20 serially connects the capacitance CAP2 and the capacitance CAP4. The third coupling portion E30 serially connects the capacitance CAP3 and the capacitance CAP4. Therefore, capacitor characteristics of the series-connected capacitance manifest between the first external electrode 40A connected to the first internal electrode layer 31 and the second external electrode 40B connected to the second internal electrode layer 32.

In the multilayer ceramic capacitor 1 according to the third example embodiment, the coverage of the intermediate electrode layer 33 is higher than the coverage of the first internal electrode layer 31 and the second internal electrode layer 32. More specifically, the coverage of the first intermediate electrode layer 331, the second intermediate electrode layer 332, and the third intermediate electrode layer 333 is higher than the coverage of the first internal electrode layer 31 and the second internal electrode layer 32.

For example, in the multilayer ceramic capacitor 1 according to the third example embodiment, the coverage of both the first internal electrode layer 31 and the second internal electrode layer 32 is preferably less than about 85%, and more preferably between about 60% and about 80% inclusive, for example. The coverage of the first intermediate electrode layer 331, the second intermediate electrode layer 332, and the third intermediate electrode layer 333 is preferably about 90% or more, and more preferably about 95% or more, for example. The coverage of the intermediate electrode layer 33 is preferably at least about 10 percentage points higher, and more preferably at least about 15 percentage points higher than the coverage of both the first internal electrode layer 31 and the second internal electrode layer 32.

In the multilayer ceramic capacitor 1 according to the present example embodiment, the coverage of the first intermediate electrode layer counter portion EC1B of the first intermediate electrode layer 331, the second intermediate electrode layer counter portion EC2B of the second intermediate electrode layer 332, the third intermediate electrode layer counter portion EC3A, and the fourth intermediate electrode layer counter portion EC3B of the third intermediate electrode layer 333 is higher than the coverage of both the first internal electrode layer 31 and the second internal electrode layer 32. The third intermediate electrode layer counter portion EC3A of the third intermediate electrode layer 333 faces the first intermediate electrode layer counter portion EC1B of the first intermediate electrode layer 331, thus defining the third capacitor portion CAP3. The fourth intermediate electrode layer counter portion EC3B of the third intermediate electrode layer 333 faces the second intermediate electrode layer counter portion EC2B of the second intermediate electrode layer 332, thus defining the fourth capacitor portion CAP4. Therefore, the coverage of the internal electrode layers of the third capacitor portion CAP3 and the fourth capacitor portion CAP4 is higher than the coverage of both the first internal electrode layer 31 and the second internal electrode layer 32.

As a result, the high-withstand-voltage four-portion-structured multilayer ceramic capacitor according to the third example embodiment can enhance the capacitance, allowing for reducing or preventing interface delamination.

EXPERIMENTAL EXAMPLES

Next, experimental Examples conducted on the multilayer ceramic capacitor 1 of the first example embodiment are described, representing the multilayer ceramic capacitor 1 of the present disclosure. Samples were manufactured by lot unit according to the manufacturing method described in the first example embodiment, with the manufacturing conditions adjusted so that the coverage of each inner electrode layer was different, as Examples 1 to 3 and Comparative Examples 1 to 3. The samples in each lot were manufactured with the same manufacturing conditions.

For each Example and Comparative Example, n samples (n=5) for measuring coverage, n samples (n=10) for examining peeling, and n samples (n=10) for examining capacitance were taken and prepared from the same lot. For measuring the coverage and each examination, the average value of the measurement result was used. Specific coverage and evaluation results for each Example and Comparative Example are listed in Table 1, which will be detailed later.

First, in accordance with the manufacturing method disclosed in the first example embodiment, samples for the Examples were produced as multilayer ceramic capacitors with the following specifications:

Samples

Size of the multilayer ceramic capacitor: 3.4 mm (L)×2.7 mm (W)×2.7 mm (T)

Rated voltage: 1000 V

Dielectric layer: $CaZrO_3$ (thickness of the dielectric layer: 3.96 μm)

Internal electrode layer: Ni (coverage of the internal electrode layer: refer to Table 1)

Structure of the multilayer body: Two-portion structure

Measurement of Coverage

The coverage was measured using the method described above.

Delamination Test

An ultrasonic flaw detector was used to irradiate the samples with 20 kHz ultrasonic waves, and internal cracks or delamination were detected based on the difference between the incident waves and the reflected waves. The interface delamination occurrence time and the interface full delamination time of the dielectric layer and the internal electrode layer were evaluated using the following method.

The chip was polished to expose the internal electrode layer. The exposed surface of the internal electrode layer was cleaned with a mixed solution primarily composed of ethanol.

The multilayer chip was held with tweezers, which were fixed to a stand. The negative pole of the DC power source was connected to the upper a portion of the tweezers. The stand was adjusted so that a portion of the multilayer chip held by the tweezers was immersed in a sodium hydroxide solution included in a petri dish.

One end of a Pt wire connected to the positive pole of the DC power source was immersed in the sodium hydroxide solution in the petri dish.

A voltage of 5 V from the DC power source was applied, and the presence or absence of crack formation was checked every minute using the ultrasonic flaw detector.

The time from the start of the 5 V voltage application to the first confirmation of interface delamination was recorded as the interface delamination occurrence time. The time from the start of the 5 V voltage application until confirming the entire interface delamination was recorded as the interface full delamination time.

As for the evaluation criteria for the delamination test, the interface full delamination time of 40 minutes or more was defined as a pass (○), and less than 40 minutes was defined as a fail (x).

Examination for Capacitance

A C-meter was used to measure the capacitance under the conditions of a frequency of 120 Hz and an applied voltage of 0.5 Vrms. In Table 1, with a capacitance of Comparative Example 1 as a reference, a range within about ±5% of the capacitance of Comparative Example 1 was considered the passing range. Samples with the capacitance within this range were considered a pass (○), and samples with the capacitance outside this range were considered a fail (x).

Table 1 illustrates the measurement results and evaluation results for Examples 1 to 3 and Comparative Examples 1 to 3.

TABLE 1

| | Coverage of the first internal electrode layer and the second internal electrode layer(%) | Coverage of the intermediate electrode layer(%) | Interface delamination occurrence time(min) | Interface full delamination time(min) | Interface delamination defect judgment | Capacitance judgment | Overall judgment |
|---|---|---|---|---|---|---|---|
| Comparative Example 1 | 96 | 94 | 20 | 22 | x | ○ | x |
| Comparative Example 2 | 84 | 82 | 28 | 31 | x | ○ | x |
| Example 1 | 79 | 96 | 40 | 42 | ○ | ○ | ○ |
| Example 2 | 71 | 95 | 42 | 45 | ○ | ○ | ○ |
| Example 3 | 62 | 92 | 50 | 52 | ○ | ○ | ○ |
| Comparative Example 3 | 69 | 67 | 68 | 72 | ○ | x | x |

In Table 1, the measurement results include the coverage of the first internal electrode layer and the second internal electrode layer, the coverage of the intermediate electrode layer, the interface delamination occurrence time, and the interface full delamination time. The evaluation results in Table 1 include the interface delamination defect judgment, the capacitance judgment, and the overall judgment.

The overall judgment in Table 1 is based on the results of the interface delamination defect judgment and the capacitance judgment. For instance, when the results of the interface delamination defect judgment and the capacitance judgment are a pass (○), the overall judgment is a pass (○). When the result of either the interface delamination defect judgment or the capacitance judgment is a fail (x), the overall judgment is a fail (x).

In Examples 1 to 3, since the interface delamination defect judgment and the capacitance judgment are a pass, the overall judgment is a pass. Here, in Examples 1 to 3, the coverage of the first internal electrode layer and the second internal electrode layer is lower than the coverage of the intermediate electrode layer.

In Comparative Examples 1 to 3, since either the interface delamination defect judgment or the capacitance judgment is a fail, the overall judgment is a fail. More specifically, in Comparative Examples 1 and 2, the capacitance judgment is a pass, but the interface delamination defect judgment is a fail, thus the overall judgment is a fail. In Comparative Example 3, the interface delamination defect judgment is a pass, but the capacitance judgment is a fail, thus the overall judgment is a fail.

Thus, the effects disclosed herein can be anticipated by increasing the coverage of the intermediate electrode layer 33 higher than the coverage of the first internal electrode layer 31 and the second internal electrode layer 32. For instance, the effects of reducing or preventing the interface delamination while enhancing the capacitance can be expected by relatively increasing the coverage of the intermediate electrode layer 33, compared to the case in which the coverage of the intermediate electrode layer 33 and the coverage of the first internal electrode layer 31 and the second internal electrode layer 32 are the same. The effects of reducing or preventing the interface delamination while decreasing or minimizing the reduction in capacitance can be expected by relatively decreasing the coverage of the first internal electrode layer 31 and the second internal electrode layer 32, compared to the case in which the coverage of the intermediate electrode layer 33 and the coverage of the first internal electrode layer 31 and the second internal electrode layer 32 are the same.

The coverage of the first internal electrode layer 31 and the second internal electrode layer 32 is preferably less than about 85%, more desirably between about 60% and about 80% inclusive, for example. The coverage of the intermediate electrode layer is preferably about 90% or more, more desirably about 95% or more, for example. The coverage of the intermediate electrode layer 33 is preferably at least about 10 percentage points higher, and more preferably at least about 15 percentage points higher than the coverage of the first internal electrode layer 31 and the second internal electrode layer 32.

According to the example embodiments of the multilayer ceramic capacitor 1 described above, the following effects can be achieved. The multilayer ceramic capacitors 1 may be required to withstand high voltage. The multilayer ceramic capacitor 1 designed to withstand high voltage, known as a series-structured multilayer ceramic capacitor 1, have been recognized, in which a plurality of capacitor portions are serially connected.

The series-structured multilayer ceramic capacitor 1 generating the series-connected capacitance improves the voltage resistance at the cost of reduced capacitance. In order to increase the capacitance, the number of stacked internal electrode layers 30 needs to be increased. However, increasing the number of stacked layers will heighten the internal stress within the multilayer body 10, which becomes more prone to interface delamination.

More specifically, the multilayer ceramic capacitors 1 involves intrinsic stress due to the difference in linear coefficient of thermal expansion between the internal electrode layers 30 and the dielectric layers 20, potentially leading to delamination at the interface between the internal electrode layers 30 and the dielectric layers 20 in particular. It is known that internal stress increases with the number of stacked layers, i.e., the amount of internal electrode layer 30, posing a barrier to multilayering.

In particular, in the multilayer ceramic capacitors 1 for medium to high voltage applications, a series structure may be used to distribute the voltage applied to each capacitor portion (the portion generating the capacitance). However, reducing the voltage applied to each capacitor portion while maintaining the capacitance requires an increase in the number of layers depending on the number of series, which in turn increases the intrinsic stress and the risk of interface delamination.

Attention is particularly required to prevent interface delamination from occurring at the extension electrodes, which may be the starting points for infiltration of moisture or plating solutions.

Therefore, the coverage of the intermediate electrode layer 33 is increased higher than the coverage of both the first internal electrode layer 31 and the second internal electrode layer 32, in other words, the coverage of both the first internal electrode layer 31 and the second internal electrode layer 32 is set lower than the coverage of the intermediate electrode layer 33, thus allowing for reducing or preventing interface delamination, while decreasing or minimizing the reduction in capacitance, even in the high-withstand-voltage multilayer ceramic capacitor 1.

The multilayer ceramic capacitor 1 according to the example embodiments includes the multilayer body 10 that includes the plurality of stacked dielectric layers 20, and the plurality of stacked internal electrode layers 30. The multilayer body 10 includes the first main surface TS1 and the second main surface TS2 on opposite sides in the lamination direction T, the first lateral surface WS1 and the second lateral surface WS2 on opposite sides in the width direction W orthogonal or substantially orthogonal to the lamination direction T, and the first end surface LS1 and the second end surface LS2 on opposite sides in the length direction L orthogonal or substantially orthogonal to both the lamination direction T and the width direction W. The multilayer ceramic capacitor 1 includes the first external electrode 40A on the first end surface LS1, and the second external electrode 40B positioned on the second end surface LS2. The plurality of internal electrode layers 30 include the first internal electrode layer 31, the second internal electrode layer 32, and the intermediate electrode layer 33. The first internal electrode layer 31 includes the first extension portion D1 with one end extending to the first end surface LS1 and connected to the first external electrode 40A, and the first counter portion EA which is connected to the first extension portion D1 and which faces the internal electrode layer 30 adjacent in the lamination direction T. The second internal electrode layer 32 includes the second extension portion D2 with one end extending to the second end surface LS2 and connected to the second external electrode 40B, and the second counter portion EB which is connected to the second extension portion D2 and which faces the internal electrode layer 30 adjacent in the lamination direction T. The intermediate electrode layer 33, not connected to either the first external electrode 40A or the second external electrode 40B, is the internal electrode layer 30 defining the serially connected capacitor elements together with the first internal electrode layer 31 and the second internal electrode layer 32. The coverage of the intermediate electrode layer 33 is higher than the coverage of both the first internal electrode layer 31 and the second internal electrode layer 32.

As a result, even the high-withstand-voltage multilayer ceramic capacitors 1 can reduce or prevent the occurrence of interface delamination, while decreasing or minimizing the reduction in capacitance.

In the multilayer ceramic capacitor 1 according to the example embodiments, the coverage of both the first internal electrode layer 31 and the second internal electrode layer 32 is between about 60% and about 80% inclusive, for example.

Thus, even the high-withstand-voltage multilayer ceramic capacitors 1 can more effectively reduce or prevent the occurrence of interface delamination, while decreasing or minimizing the reduction in capacitance.

In the multilayer ceramic capacitor 1 according to the example embodiments, the coverage of the intermediate electrode layer 33 is about 90% or more, for example.

As a result, even the high-withstand-voltage multilayer ceramic capacitors 1 can enhance the capacitance, while reducing or preventing interface delamination.

In the multilayer ceramic capacitor 1 according to the example embodiments, the coverage of the intermediate electrode layer 33 is at least about 10 percentage points higher than the coverage of both the first internal electrode layer 31 and the second internal electrode layer 32.

Thus, even the high-withstand-voltage multilayer ceramic capacitors 1 can more effectively reduce or prevent the occurrence of interface delamination, while decreasing or minimizing the reduction in capacitance.

In the multilayer ceramic capacitor 1 according to the second example embodiment, the intermediate electrode layer 33 includes the first intermediate electrode layer 331 and the second intermediate electrode layer 332. The first intermediate electrode layer 331 includes the first electrode layer-side counter portion EC1A facing the first internal electrode layer 31 adjacent in the lamination direction T, and the first intermediate electrode layer counter portion EC1B facing the second intermediate electrode layer adjacent in the lamination direction T. The second intermediate electrode layer 332 includes the second electrode layer-side counter portion EC2A facing the second internal electrode layer 32 adjacent in the lamination direction T, and the second intermediate electrode layer counter portion EC2B facing the first intermediate electrode layer 331 adjacent in the lamination direction T.

Thus, even the high-withstand-voltage three-portion-structured multilayer ceramic capacitors 1 can reduce or prevent the occurrence of interface delamination, while decreasing or minimizing the reduction in capacitance.

In the third example embodiment of the multilayer ceramic capacitor 1, the intermediate electrode layers 33 include the first intermediate electrode layer 331, the second intermediate electrode layer 332, and the third intermediate electrode layer 333. The first intermediate electrode layer 331 includes the first electrode layer-side counter portion EC1A facing the first internal electrode layer 31 adjacent in the lamination direction T, and the first intermediate electrode layer counter portion EC1B facing the third intermediate electrode layer 333 adjacent in the lamination direction T. The second intermediate electrode layer 332 includes the second electrode layer-side counter portion EC2A facing the second internal electrode layer 32 adjacent in the lamination direction T, and the second intermediate electrode layer counter portion EC2B facing the third intermediate electrode layer 333 adjacent in the lamination direction T. The third intermediate electrode layer 333 includes the third intermediate electrode layer counter portion EC3A facing the first intermediate electrode layer 331 adjacent in the lamination direction T, and the fourth intermediate electrode layer counter portion EC3B facing the second intermediate electrode layer 332 adjacent in the lamination direction T.

Even the high-withstand-voltage four-portion-structured multilayer ceramic capacitor 1 as such can reduce or prevent the occurrence of interface delamination, while decreasing or minimizing the reduction in capacitance.

In the multilayer ceramic capacitor 1 according to the present example embodiment, the dielectric layer 20 includes a perovskite-type compound including at least Ca and Zr.

As a result, even the high-withstand-voltage multilayer ceramic capacitor 1 can improve heat resistance and high-frequency characteristics, and reduce or prevent the occurrence of interface delamination, while decreasing or minimizing the reduction in capacitance.

The present invention is not limited to the configurations of the example embodiments, and can be modified and applied within the scope that does not change the spirit of the present invention. Combinations of two or more of the individual desirable configurations described in the example embodiments are also within the scope of the present invention.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:
   a multilayer body that includes a plurality of stacked dielectric layers, a plurality of stacked internal electrode layers, a first main surface and a second main surface on opposite sides in a lamination direction, a first lateral surface and a second lateral surface on opposite sides in a width direction orthogonal or substantially orthogonal to the lamination direction, and a first end surface and a second end surface on opposite sides in a length direction orthogonal or substantially orthogonal to both the lamination direction and the width direction;
   a first external electrode on the first end surface; and
   a second external electrode on the second end surface;
   wherein
   the plurality of internal electrode layers include a first internal electrode layer, a second internal electrode layer, and an intermediate electrode layer;
   the first internal electrode layer includes a first extension portion with one end extending to the first end surface and connected to the first external electrode, and a first counter portion which is connected to the first extension portion and faces an internal electrode layer adjacent in the lamination direction;

the second internal electrode layer includes a second extension portion with one end extending to the second end surface and connected to the second external electrode, and a second counter portion which is connected to the second extension portion and faces an internal electrode layer adjacent in the lamination direction;

the intermediate electrode layer, not connected to either the first external electrode or the second external electrode, is an internal electrode layer that defines a serially connected capacitor element together with the first internal electrode layer and the second internal electrode layer; and a coverage of the intermediate electrode layer is higher than a coverage of the first internal electrode layer and a coverage of the second internal electrode layer.

2. The multilayer ceramic capacitor according to claim 1, wherein the coverage of the first internal electrode layer and the coverage of the second internal electrode layer are between about 60% and about 80% inclusive.

3. The multilayer ceramic capacitor according to claim 1, wherein the coverage of the intermediate electrode layer is about 90% or more.

4. The multilayer ceramic capacitor according to claim 1, wherein the coverage of the intermediate electrode layer is at least about 10 percentage points higher than the coverage of the first internal electrode layer and the coverage of the second internal electrode layer.

5. The multilayer ceramic capacitor according to claim 1, wherein the intermediate electrode layer includes a first intermediate electrode layer and a second intermediate electrode layer;

the first intermediate electrode layer includes a first electrode layer-side counter portion facing the first internal electrode layer adjacent in the lamination direction, and a first intermediate electrode layer counter portion facing the second intermediate electrode layer adjacent in the lamination direction; and the second intermediate electrode layer includes a second electrode layer-side counter portion facing the second internal electrode layer adjacent in the lamination direction, and a second intermediate electrode layer counter portion facing the first intermediate electrode layer adjacent in the lamination direction.

6. The multilayer ceramic capacitor according to claim 1, wherein the intermediate electrode layer includes a first intermediate electrode layer, a second intermediate electrode layer, and a third intermediate electrode layer;

the first intermediate electrode layer includes a first electrode layer-side counter portion facing the first internal electrode layer adjacent in the lamination direction, and a first intermediate electrode layer counter portion facing the third intermediate electrode layer adjacent in the lamination direction;

the second intermediate electrode layer includes a second electrode layer-side counter portion facing the second internal electrode layer adjacent in the lamination direction, and a second intermediate electrode layer counter portion facing the third intermediate electrode layer adjacent in the lamination direction; and the third intermediate electrode layer includes a third intermediate electrode layer counter portion facing the first intermediate electrode layer adjacent in the lamination direction, and a fourth intermediate electrode layer counter portion facing the second intermediate electrode layer adjacent in the lamination direction.

7. The multilayer ceramic capacitor according to claim 1, wherein the coverage of the intermediate electrode layer is at least about 15 percentage points higher than the coverage of the first internal electrode layer and the coverage of the second internal electrode layer.

8. The multilayer ceramic capacitor according to claim 1, wherein the multilayer ceramic capacitor is a temperature compensating capacitor.

9. The multilayer ceramic capacitor according to claim 1, wherein the multilayer body is rectangular or substantially rectangular parallelepiped shaped.

10. The multilayer ceramic capacitor according to claim 1, wherein two capacitor portions are provided and serially connected.

11. The multilayer ceramic capacitor according to claim 1, wherein the multilayer body includes a conductive resin layer.

12. The multilayer ceramic capacitor according to claim 1, wherein the multilayer ceramic capacitor has a dimension in the length direction between about 0.2 mm and about 10 mm inclusive, a dimension in the lamination direction between about 0.1 mm and about 10 mm inclusive, and a dimension in the width direction of about 0.1 mm and about 10 mm inclusive.

13. The multilayer ceramic capacitor according to claim 1, wherein each of the first internal electrode, the second internal electrode, and the intermediate internal electrode includes metal material and hollow portions excluding the metal material.

14. The multilayer ceramic capacitor according to claim 13, wherein the coverage is defined by a proportion of the metal material included in each of the first internal electrode, the second internal electrode, and the intermediate internal electrode.

15. The multilayer ceramic capacitor according to claim 13, wherein the coverage is defined by a coverage rate of each of the first internal electrode, the second internal electrode, and the intermediate internal electrode over a corresponding one of the plurality of dielectric layers.

16. The multilayer ceramic capacitor according to claim 13, wherein the hollow portions include ceramic materials or glass or are voids.

17. The multilayer ceramic capacitor according to claim 13, wherein the first internal electrode layer and the second internal electrode layer include a larger proportion of the hollow portions without metal, compared to the intermediate electrode layer.

18. The multilayer ceramic capacitor according to claim 1, wherein the coverage of the first internal electrode layer and the coverage of the second internal electrode layer is less than about 85%.

19. The multilayer ceramic capacitor according to claim 1, wherein the coverage of the intermediate electrode layer is about 95% or more.

20. The multilayer ceramic capacitor according to claim 1, wherein three capacitor portions are provided and serially connected.

* * * * *